United States Patent [19]

Alferness et al.

[11] 3,889,237

[45] June 10, 1975

[54] COMMON STORAGE CONTROLLER FOR DUAL PROCESSOR SYSTEM

[75] Inventors: Merwin H. Alferness, New Brighton; John A. Miller, Roseville, both of Minn.

[73] Assignee: Sperry Rand Corporation, New York, N.Y.

[22] Filed: Nov. 16, 1973

[21] Appl. No.: 416,699

[52] U.S. Cl. .............................................. 340/172.5
[51] Int. Cl. .............................................. G06f 15/16
[58] Field of Search ........................ 340/172.5; 444/1

[56] References Cited

UNITED STATES PATENTS

| | | | |
|---|---|---|---|
| 3,566,363 | 2/1971 | Driscoll, Jr. | 340/172.5 |
| 3,581,291 | 5/1971 | Iwamoto et al. | 340/172.5 |
| 3,588,829 | 6/1971 | Boland et al. | 340/172.5 |
| 3,618,040 | 11/1971 | Iwamoto et al. | 340/172.5 |
| 3,631,405 | 12/1971 | Hoff et al. | 340/172.5 |
| 3,638,195 | 1/1972 | Brender et al. | 340/172.5 |
| 3,643,223 | 2/1972 | Ruth et al. | 340/172.5 |
| 3,678,467 | 7/1972 | Nussbaum et al. | 340/172.5 |
| 3,710,349 | 1/1973 | Miwa et al. | 340/172.5 |
| 3,735,360 | 5/1973 | Anderson et al. | 340/172.5 |
| 3,771,137 | 11/1973 | Barner et al. | 340/172.5 |

*Primary Examiner*—Gareth D. Shaw
*Assistant Examiner*—John P. Vandenburg
*Attorney, Agent, or Firm*—Thomas J. Nikolai; Kenneth T. Grace; Marshall M. Truex

[57] ABSTRACT

Control devices for permitting two or more general purpose digital computers, each with its own main storage module, to share a common data base. The control devices, termed "Common Storage Controller(s)" contain the logic circuitry for interfacing the central processors to their storage units such that when a predetermined area of the storage is being addressed by its associated processor for a write operation, a duplicate copy of the information will be written into the corresponding area of the storage unit associated with the other processor(s).

12 Claims, 17 Drawing Figures

COMMON STORAGE CONTROLLER FOR DUAL PROCESSOR SYSTEM

BACKGROUND OF THE INVENTION

Where a computer user wishes to upgrade his computing system because of an increase in work load to be handled, it is often convenient to add an additional central processor to the system and allow both central processors, each with its own executive and worker programs, to simultaneously share a single data base which may be contained in the system's drum, disc and tape mass storage units. To accomplish this, however, it is necessary that the main memory unit of each central processor maintain identical information relating to mass storage subsystem availability. Thus, an area in each of the central processors' main memory is set aside to store identical data in the form of control tables which continually keep track of the mass storage units available at a given time and an indication of the channels by which the mass storage units may be accessed by a given central processor unit. Stated otherwise, the main memory of each central processor must contain duplicate images of all information pertaining to the status and use of the mass storage devices utilized in the system. The area in the main memory which the duplicate images are maintained is the so-called "common memory".

The present invention provides a means for ensuring that any main memory access to the common memory area by one of the plural processors in the system for the purpose of effecting a "write" operation will automatically cause a copy of the data to be written also to be stored in the common memory of the remaining central processors. A novel control device, hereinafter termed the Common Storage Controller, is provided as an adjunct to each central processor utilized in the system which is capable of detecting a write reference to the common memory area of its associated main memory, and in response thereto, sends a request control signal to the other Common Storage Controller(s) used in the system to write the same information into the common memory of the processor(s) with which it is associated.

OBJECTS

It is accordingly an object of the present invention to provide a control device which will permit two or more identical central processors, each with its own main memory unit, to share a common data base residing in mass storage devices in executing programs of instructions in the solution of a data processing problem.

It is another object of this invention to provide a means for maintaining identical system control information in the main memory of the plural processors used in the system.

Still another object of the invention is to provide a control device for each central processor unit used in a plural processor data processing system which is operative to detect situations where one processor in the system is altering the information stored in a preassigned area of its associated main memory and for signaling the fact to the other control devices in the system so that the corresponding preassigned areas in the main memories of the remaining processors will be identically altered.

These and other objects, features and advantages of the invention will become apparent from the following more particular description of the preferred embodiment of the invention as illustrated in the accompanying drawings.

DESCRIPTION OF SYSTEM ORGANIZATION

Figure 1:
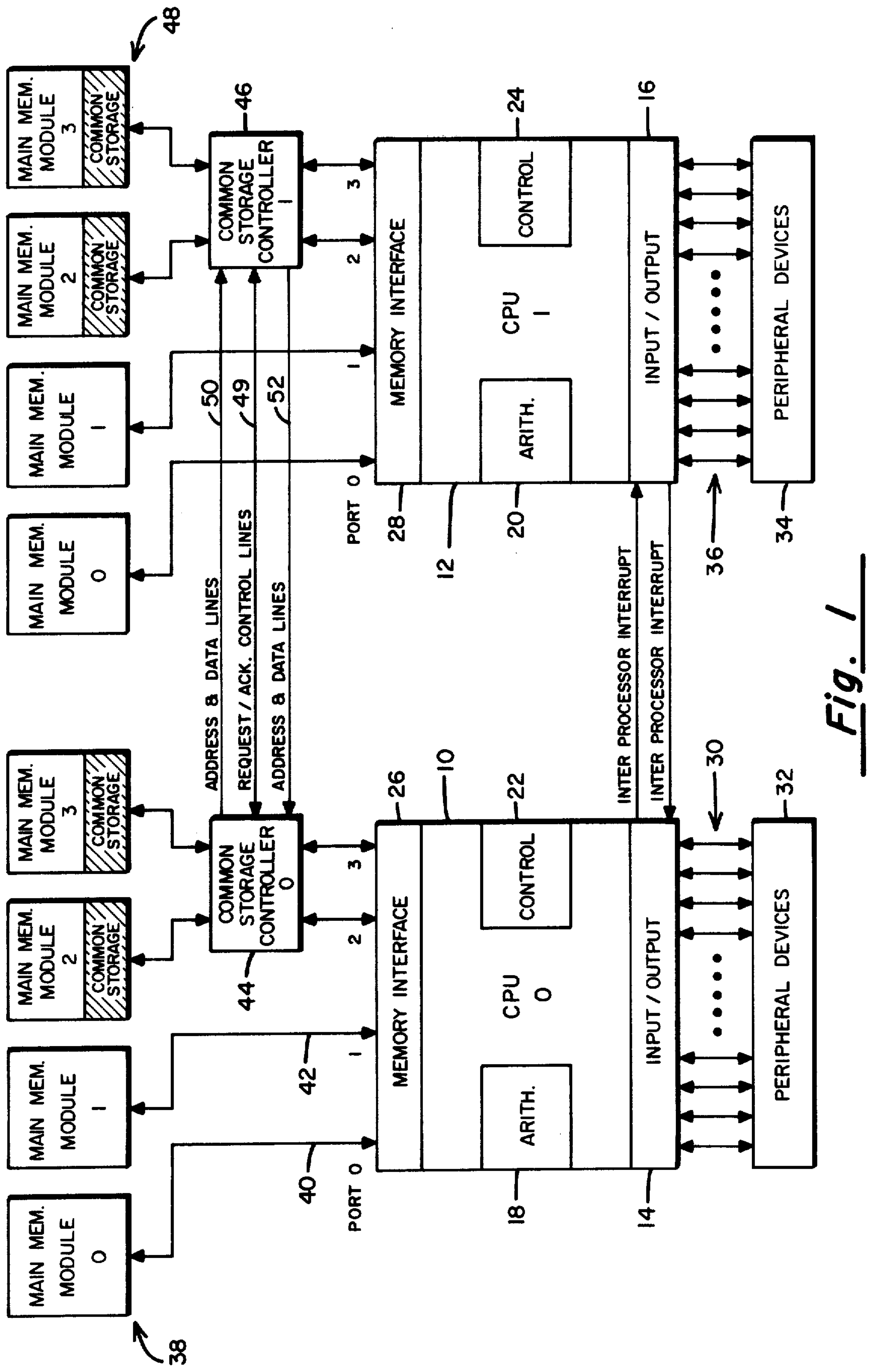
FIG. 1 is a block diagram illustrating a dual computer data processing system incorporating the Common Storage Controllers.

Referring now to FIG. 1, there is shown in block diagram form a dual-computer data processing system. The system comprises first and second general purpose digital computers 10 and 12.

A general purpose digital computer highly suitable for use in a dual-computer configuration is the UNIVAC 494 central processor unit manufactured and sold by the Sperry Univac Division of the Sperry Rand Corporation. It should be understood, however, that other digital computers may be made to operate in a dual configuration, provided the teachings of the present invention are adhered to. For a fuller understanding of the construction and mode of operation of the UNIVAC 494 central processing unit, reference may be made to a publication entitled, "UNIVAC 494 Real Time System Central Processor Unit", copyrighted 1966, 1969, 1973 by the Sperry Rand Corporation. As is described in that publication, the CPU's used in the system depicted in FIG. 1 may have an input/output section 14, 16, an arithmetic section 18, 20, a control section 22, 24 and a memory interface 26, 28. Connected to the input/output section 14 of computer 10 (herein designated CPU 0) by a plurality of input/output channels 30 are a number of peripheral devices epresented by block 32. The peripheral devices may nclude, for example, one or more magnetic storage lrums, magnetic disc storage units, magnetic tape mits, printers, etc. Similarly, additional peripheral de/ices represented by block 34 are connected to the in)ut/output section 16 of computer 12 (hereinafter re'erred to as CPU 1) by means of input/output channels 36. In a dual processor computing system such as illus.rated in FIG. 1, CPU 0 and CPU 1 may share common )eripheral devices as well as have their own indepenlent peripheral devices.

The primary storage or main memory for the UNIVAC 494 computer system is a direct-access, 32-plane, coincident-current ferrite core memory. The 32 planes permit storage of 30-bit words, with a parity bit for each half of a word. Each access to the memory is an access to the entire 30-bit word, to the lower 15-bits, to the upper 15-bits, or to selected portions of the word at a specified location. Each memory module includes a 15-bit address register providing a continuous addressing structure for 32,768 words. The CPU actually generates a 17-bit address for each storage location reference, 15-bits being used to select one of the 32,768 words and the remaining 2-bits being used to select the module within the bank. In usual system operation, in order to decrease the processing time, odd/even addressing is employed so that instruction and operand addresses may be interleaved. In this arrangement, all even addresses are referred to one module and all odd addresses are referred to another module.

In the preferred embodiment of the present invention, then, memory bank 38 associated with CPU 0 may comprise a plurality of modules, such as are labelled Module 0 through Module 3 in the block diagram of FIG. 1. Each module contains a plurality of addressable registers for storing both instruction words and operands. These instruction words and operand words may be 30-bits in length. Module 0 may contain the even addresses from 0 to 65,534, Module 1 may contain the odd addresses from 1 to 65,535, Module 2 the even addresses from 65,536 through 131,070 and Module 3 the odd addresses between 65,537 and 131,071. It is to be understood, however, that the word length, the memory size and the odd/even address assignment is not critical and the foregoing arrangement is set forth by way of example only.

In a unit processor system, the memory modules are directly connected to ports of the CPU memory interface unit 26. More specifically, Main Memory Module 0 is connected to Memory Interface Port 0 by way of a cable 40 which contains a plurality of address lines and data lines so that operands and instructions can be read from or written into Module 0 at any one of the even addresses from 0 to 65,534. Again, by way of example, if the word stored at any one of these addresses is 30-bits in length as suggested above, cable 40 would include 30 data lines for read data and 30 data lines for write data, allowing a parallel transfer of an entire word as well as 15 address lines for uniquely selecting any one of the plural addresses available in the Memory Module 0. Similarly, in a unit computer configuration, Main Memory Module 1 would be connected to Port 1 of the Memory Interface Unit 26 by way of a cable 42 and Modules 2 and 3 would likewise be directly cabled to Interface Ports 2 and 3.

In a dual processor configuration, the Main Memory Modules 2 and 3 are not directly connected to Ports 2 and 3 of the Memory Interface Unit 26, but instead a unit, termed the Common Storage Controller 44, is disposed between the Memory Interface Ports 2 and 3 and the Main Memory Modules 2 and 3. As will be explained more fully hereinbelow, the Common Storage Controller 44 (CSC 0) permits the transfer of information from Main Memory Modules 2 and 3 to CPU 0 and also interfaces CPU 0 with CPU 1 via the Common Storage Controller 46 associated with that last mentioned processor.

Referring to CPU 1 momentarily, it too has associated with it a main memory bank 48 comprising a plurality of modules, namely, Main Memory Modules 0 through 3. Again, these memory modules are either directly connected to the Memory Interface Unit 28 ports or indirectly connected to these ports by way of the Common Storage Controller 46 (CSC 1).

As was mentioned in the introductory portion of this specification, in order for plural computers to utilize a common data base stored in a mass storage device accessable via the I/O channels 30 and 36, it is necessary that certain control tables, relating to the location of information in the mass storage device, be contained in the main memory banks of each of the processors used in the system. As is illustrated in FIG. 1, a range of addresses is set aside in Main Memory Modules 2 and 3 of each of the memory banks 38 and 48 for storing such mass storage control information. These areas are designated as "common storage" and are shown as being cross-hatched. The size of the common storage area in terms of word capacity is a variable, dependent upon the nature of the problem to be performed. Once established, however, it remains fixed in size until manually changed by a human operator.

In order to function as a dual processor system sharing a common data base, it is essential that the information stored in the common storage area of memory bank 38 be identical to that stored in the common storage areas of memory bank 48. The Common Storage Controllers 44 and 46 perform this function. For example, if it is assumed that CPU 0 wishes to write new information into the common storage area of Modules 2 or 3 of bank 38, CSC 0 senses this and transfers a "Write Request" by way of a control line 49 to CSC 1 associated with CPU 1. Along with this Write Request control signal, the address of the word in storage to be altered and the data to be inserted therein is also transmitted. This transfer is made by way of the lines in cable 50. Thus, the same information which CPU 0 wishes to write into the common storage areas of memory bank 38 will also be written into the common storage areas of memory bank 48 associated with processor CPU 1. In a similar fashion, when the Common Storage Controller 46 senses that CPU 1 wishes to write information into the common storage area of memory bank 48, the CSC 1 sends a Write Request signal to CSC 0 by way of control lines 49 and also provides the write address and data to be written by way of cable 52 to CSC 0 so that this same information can be stored at the identical address in the common storage areas of memory bank 38.

COMMON STORAGE CONTROLLER — GENERAL DESCRIPTION

Referring now to FIGS. *2a* and *2b*, there is shown enclosed by block 60 the principle components comprising the CSC 44 or 46 in FIG. 1. For the purpose of explanation, in the following description FIGS. 2*a* and 2*b* are considered to show CSC 0 illustrated in FIG. 1. It should be understood, however, that CSC 1 is identical in construction to CSC 0, so that the same explanation pertains equally to CSC 1.

Contained within the CSC's are a plurality of gating means termed "selectors" which are operative to control the transfer of data and/or addresses between its associated CPU and Main Memory Modules 2 and 3 or from other CSC's used in the system. More specifically, there is provided a first Read Data Selector 62 adapted to receive data read out from Memory Module 2 on the thirty parallel data lines connecting that module to the Selector 62 and to transfer same to Port 2 on the Memory Interface Unit 26 (FIG. 1) when the selector gates are enabled by a control signal generated by the Priority Control network 64. Similarly, the Read Data Selector 66 comprises a gating means for controlling the transfer of read data from Memory Module 3 to Port 3 of the Memory Interface Unit of CPU 0. Again, this transfer takes place at a time determined by the Priority Control network 64.

In the system configuration shown in FIG. 1, there are two possible sources of write data. It may originate at CPU 0 for entry in memory bank 38 or it may come from CSC 1 for entry into memory bank 38. When the write data is originated in CPU 0, this data is simultaneously applied to Memory Interface Unit Ports 0, 1, 2 and 3. However, only one of the modules will receive the write data, i.e., the one receiving a Write Request control signal originated by one of the CPU's. Thus, it is only necessary to connect the write data lines from one port of the CPU 0 Interface Unit to CSC 0. As is shown in the block diagram of FIG. 2, it is CPU 0 Interface Port 3 which is used for applying the write data to Memory Modules 2 and 3 in bank 38. Write data for either private or common store in Modules 2 and 3 passes through Selectors 80, 82 and write drivers 84, 86, but only that memory module to which a "Write" control signal is delivered will actually store the write data in a specified address location.

More specifically, write data from CSC 1 enters CSC 0 on the lines 78 which are applied as inputs to the Write Data Selectors 80 and 82. Also, data signals from CPU 0, destined for the common storage area of memory bank 38, are applied to inputs of these Write Data Selectors. These independently controlled selectors, when enabled by a control signal from the Priority Control network 64, energize the write drivers 84 and 86 so as to apply the appropriate write drive currents to Memory Modules 2 and 3, respectively.

Write data destined for the common storage area of memory bank 48 associated with CPU 1 enters CSC 0 by way of CPU 0 Interface Port 3 and inverter circuits 68, 70 and 88.

Address representing signals for uniquely selecting a single memory address in the Main Memory Modules 2 and 3 of memory bank 38 and which are developed by CPU 0 at Memory Interface Ports 2 and 3 are applied to CSC 0 by way of the 15 lines in cables 94 and 96, respectively. The signals applied to input cable 94 are inverted by inverter network 98 and applied in parallel to the Address Selectors 100 and 102. Similarly, the address representing signals applied by way of input cable 96 are inverted by network 104 and applied in parallel to the Address Selectors 100 and 106. Address representing signals originating at CPU 1 and transmitted through CSC 1 enter CSC 0 by way of the lines in cable 108 and after being inverted by network 110 are applied in parallel to the Address Selector networks 102 and 106. Again, the Address Selector networks 100, 102 and 106 are merely sets of gates which, when enabled by a control signal developed in the Priority Control network 64, cause the input address representing signals to be applied to CSC 1, Memory Module 2 of memory bank 38, or Memory Module 3 of memory bank 38, depending upon whether it is the gates in selector networks 100 and 102 or 106 which are enabled.

Further included in CSC 0 of FIGS. 2*a* and 2*b* are Compare circuits 112 and 114. These two networks compare selected bits of an input address, originating at CPU 0 Memory Interface Ports 2 or 3 with a fixed value determined by the size of the common storage area established in Memory Modules 2 and 3 of bank 38 as being required to store the requisite control tables, and produce a control signal whenever the address representing signals exceed the boundary value prewired in the Compare units 112 and 114. These control signals are applied by way of conductors 116 and 118 to the CSC 0 Timing and Control network 120. Thus, whenever the comparators 112 and 114 detect that a Write operation is to be performed within the common storage area of its associated memory bank, this fact will be signaled to the Timing and Control network.

The UNIVAC 494 central processing unit communicates with its peripheral devices and with its memory bank on a so-called "Request/Acknowledge" basis. That is, when CPU 0 wishes to communicate with one of its memory modules, it presents a Request control signal with or without a write control activated to determine whether a write or a read operation is to be performed in that module. When the module has completed the communication task, such as by accepting the new write data or presenting the read data to the CPU interface, the memory module indicates this fact by sending back an "Acknowledge" control signal to the CPU. When two or more UNIVAC 494 CPU's are operating in a dual-computer arrangement, a Common Storage Controller is disposed between CPU Interface Ports 2 and 3 and the Main Memory Modules 2 and 3 (See FIG. 1). Therefore, provision must be made in the CSC 60 to receive and transmit these Request/Acknowledge control signals.

When CPU 0 wishes to read from or write a word into either Main Memory Module 2 or 3 of bank 38, it presents a request signal with a write control line activated on the input line 122 which connects to the Priority Control network 64. Network 64 may also receive a request control signal from the other CSC used in the system. More particularly, CSC 0 may receive a Request control signal from CSC 1 by way of control line 124, which also connects into the Priority Control network 64.

The two storage modules of the memory bank containing the common storage area may be accessed either from its associated CPU or from the other CSC used in the system. Since there are at least two sources of requests for a single storage reference, a Priority Control network 64 is needed to control access to each module. As will be explained more fully hereinbelow when the details of the Priority Control network 64 are explained, priority is normally given on a "first come-first serve" basis. However, in the event of simultaneous requests, the request originating at the CPU will be afforded highest priority over a request originating at the other processor's CSC unit.

It is also appropriate to mention at this time that the UNIVAC 494 Central Processing Unit normally operates with a 750 nanosecond cycle time. So that a read reference may be made to a common storage area in this nominal 750 nanosecond period, a Head-Start signal generated by the CPU will always be sent from the CPU to its associated CSC before the CPU presents its Read or Write Request to any storage module. The Head-Start signal is applied to Priority Control network 64 by way of control line 125. The CSC utilizes this Head-Start signal to initiate the priority sequence in the module containing the common storage so that priority will already be determined when a request from the CPU arrives at the CSC. If it turns out that the request is not for a module containing the common storage area, the priority circuit will be cleared and a new priority scan cycle initiated.

When a CPU presents a Head-Start signal and/or the other CSC in the system presents a request to the CSC under consideration, its Priority Control network 64 determines which requesting unit is to have priority. Once priority is established, the Priority Control network 64 performs the following function:

1. It enables the Address Compare networks 112 and 114 which, as mentioned, determine if the address accompanying a request from the processor specifies a location in the common storage area;
2. it enables the Write Data Selectors 80 or 82 which place the write data signals on the write data lines leading to the storage Modules 2 or 3;
3. it enables the Address Selectors 100, 102 and 106 which function to gate the address to the storage module or to the other CSC;
4. it enables the Read Data Selectors 62 and 66 which gate the read data signals from the addressed memory location to the CPU; and
5. it transfers a request (Read or Write) for Modules 2 and 3 to storage.

The Timing and Control network 120 begins its operation when a request is presented to the storage module. This section controls the transfer of write data to the other CSC in the system if it is determined that data should be written into the common storage area of the other CSC's associated storage Modules 2 and 3. The Timing and Control section also enables the Acknowledge Gates 126 for transmitting the Acknowledge signal to the CPU and/or to the other CSC in the system, depending on the source of the initial request. The Acknowledge control signal from the memory unit may be withheld from the requesting CPU if and until the Dual Write operation to the other CSC in the system has been accomplished.

Referring now to FIGS. *3a* and *3b*, there is shown a timing chart which illustrates the time of occurrence and relative length of the various control signals developed in or utilized by the CSC in order to insure a Dual-Write operation into the common storage areas of the memory modules associated with the two CPU's used in the system. This timing chart will assist the reader in understanding the construction and mode of operation of the Timing and Control circuits 120 and the Priority Control circuits 64 in FIG. *2b*, as well as in understanding the overall operation of the Common Storage Controller modules 44 and 46 in FIG. 1. It should not be inferred from this drawing that the various control signals identified by the legends along the left hand margin of FIG. *3a* and *3b* necessarily are all produced at the time indicated since other logical conditions established by Priority Control and the Timing and Control networks may have to be met to permit this, but if the signals are produced, they will occur at the times indicated by the numerical legends located at the top of FIG. 3a and will be maintained for the durations indicated.

Figure 4:
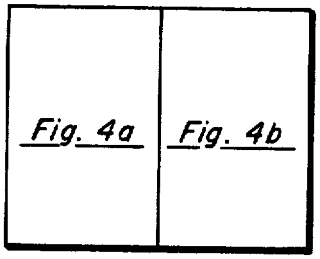
FIGS. 4*a* and 4*b* when arranged as shown in FIG. 4 illustrate the logic for determining the priority by which the Common Storage Controller will honor requests from the CPU's in the system.
Figure 5:
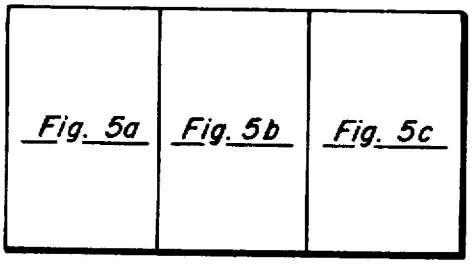
FIGS. 5*a*, 5*b* and 5*c* when arranged as shown in FIG. 5 illustrate the timing control logic for generating the commands used by the Common Storage Controller.
Figure 7:
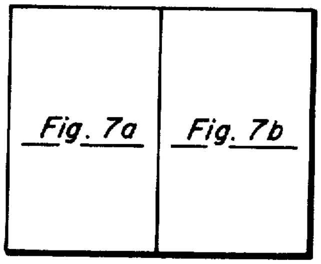
FIGS. 7*a* and 7*b* when arranged as shown in FIG. 7 show the address comparator used in the Common Storage Controller for determining whether a memory address supplied by a CPU resides in the common storage area of the main memory.

The first six timing waveforms, i.e., A–F, indicated in FIG. *3a* are either initiated when the Priority Control circuit (FIG. 4) receives either a Head-Start control signal (the signal sent from the CPU to its associated CSC in advance of all CPU memory requests to any storage module) or when CPU 0 or CSC 1 is presenting a Write request to CSC 0. The Head-Start signal generated by the CPU's control network 22 is applied to control line 128 in the Priority network of FIG. 4*a* as a low binary input to inverter 130. (In the logic circuits illustrated in FIGS. 4–10, a low signal may comprise a −3v signal and a high may be 0 volts or ground.) The resulting high output therefrom is applied as an input to an OR circuit 132, causing a low signal to be applied to the AND gate 134 connected to the input of the CPU Priority flip-flop 136. Requests from CSC 1 enter into the Priority Control network of CSC 0 by way of input line 129 and will be a high signal when such a request is present. This signal is inverted by NOT circuit 131 and applied as a first input to AND gate 133 connected to the Set input terminal of the CSC 1 Priority flip-flop 135.

The output from OR circuit 132 which occurs following the receipt of a Head-Start signal is also applied as a first input to AND gate 138 associated with the Priority Snapper delay line 140. Provided the Memory Module 2 is not locked out, as will be described hereinbelow, the AND gate 134 will be fully enabled and the CPU Priority flip-flop 136 will be set. Again, with the assumption made that the CPU is not locked out from Memory Module 2, the low signal on control line 137 coming from the CPU Lockout flip-flop (FIG. 8b) will be low and AND gate 138 will be fully enabled so as to supply an input pulse to the Priority Snapper delay line 140. A predetermined time later, determined by the particular tap thereof to which the input to emitter follower 142 is connected, the emitter follower will output a high signal on conductor 144 to disable both AND gates 133 and 134 of the Priority flip-flops 135 and 136, thus preventing any subsequent requests from the CPU 0 or CSC 1 from affecting the state of the Priority flip-flops.

Figure 8:
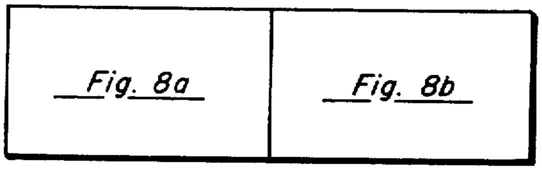
FIGS. 8*a* and 8*b* when arranged as shown in FIG. 8 show a logic diagram of the control circuits of the Common Storage Controller.
Figure 8A:
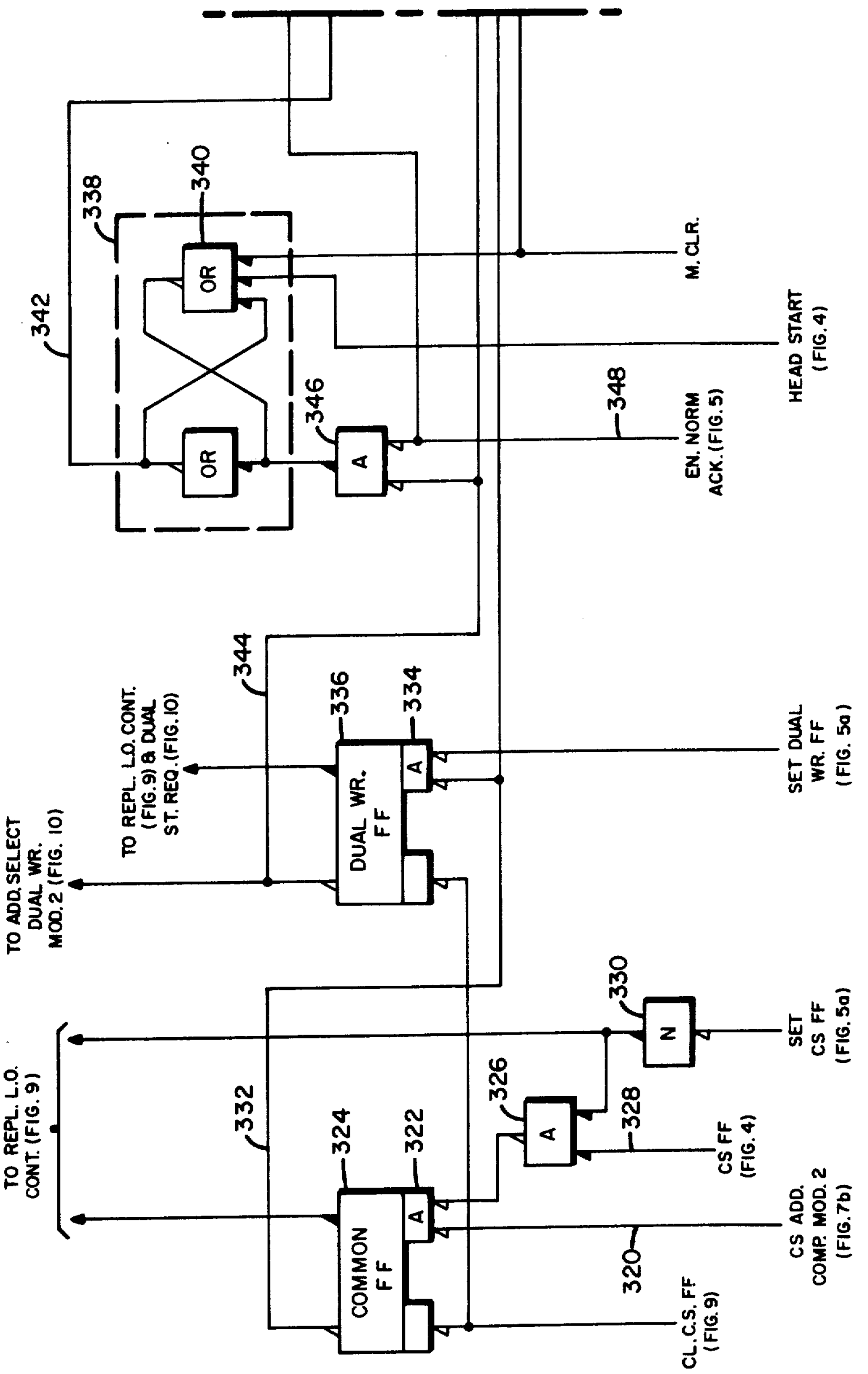

The output from the emitter follower 142 is also applied as an input to a second Priority Snapper delay line 146 and after a time delay period again determined by the particular tap of the delay line which is connected to the input of emitter follower amplifier 148, this amplifier will produce a low output signal on conductor 150 to fully enable AND gate 152, thereby causing OR circuit 154 to output a high signal on conductor 156. This, in turn, connects to the Common Store flip-flop input circuitry (FIG. 8*a*).

Figure 9:
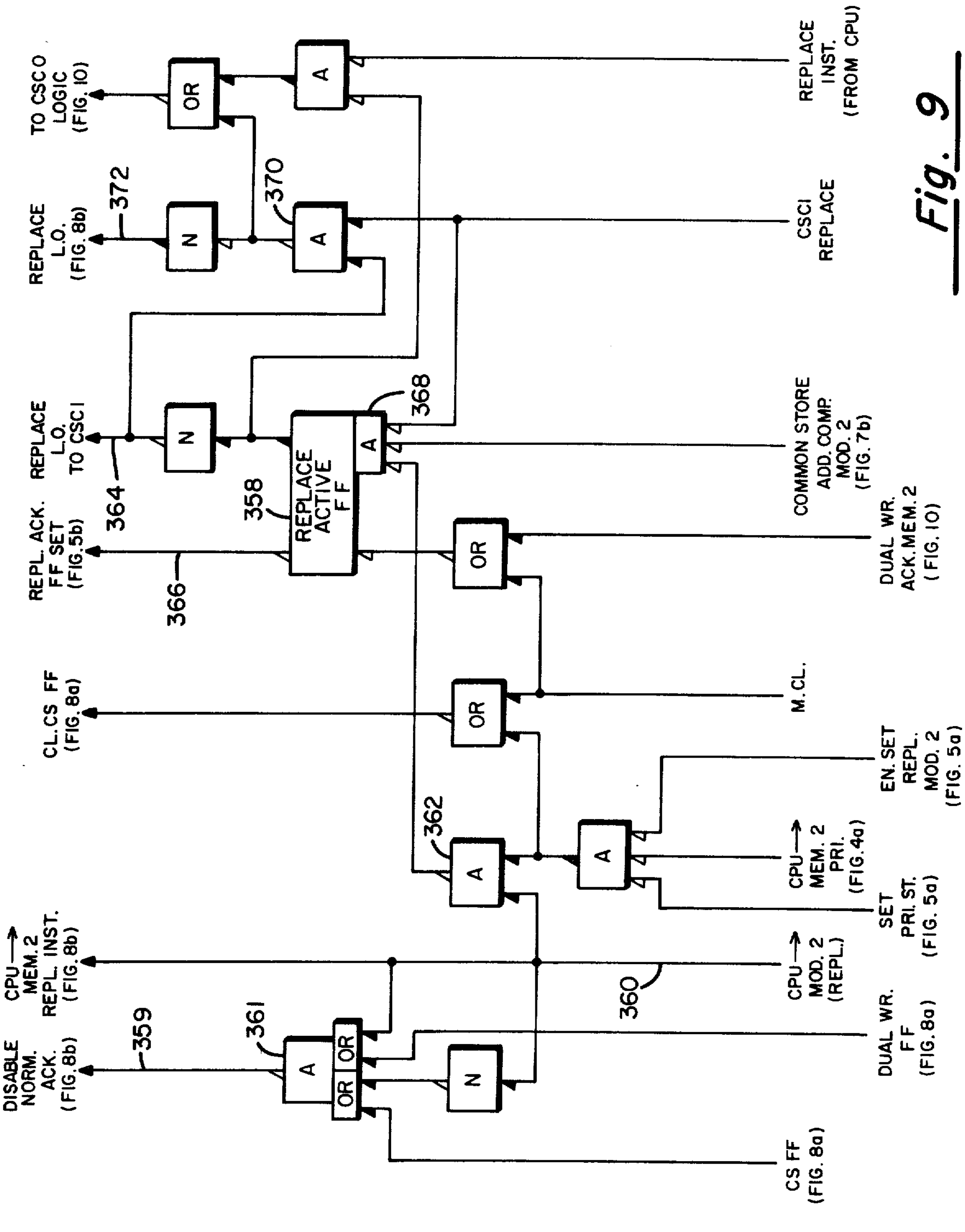
FIG. 9 is a logic diagram illustrating the control circuits for providing a lockout when a Replace class instruction is being executed by one or the other of the CPU's in the system.

The high signal on conductor 156 resulting when the CPU Priority flip-flop 136 is set is also inverted by NOT circuit 158 and the resulting low output therefrom is delivered via conductor 159 to the Set input logic of the Memory Request flip-flop 161, and via conductor 163 to the Address Comparing circuitry (FIG. 7) and to the Replace Active flip-flop (FIG. 9). The aforementioned high signal on conductor 156 is also inverted by NOT circuit 160 and the resulting low output signal on conductor 162 is delivered to the Address Selectors gates and serves as an enable signal for them, such that the desired Memory Address to be referenced is transferred from the CPU 0 to Memory Module 2.

Figure 4A:
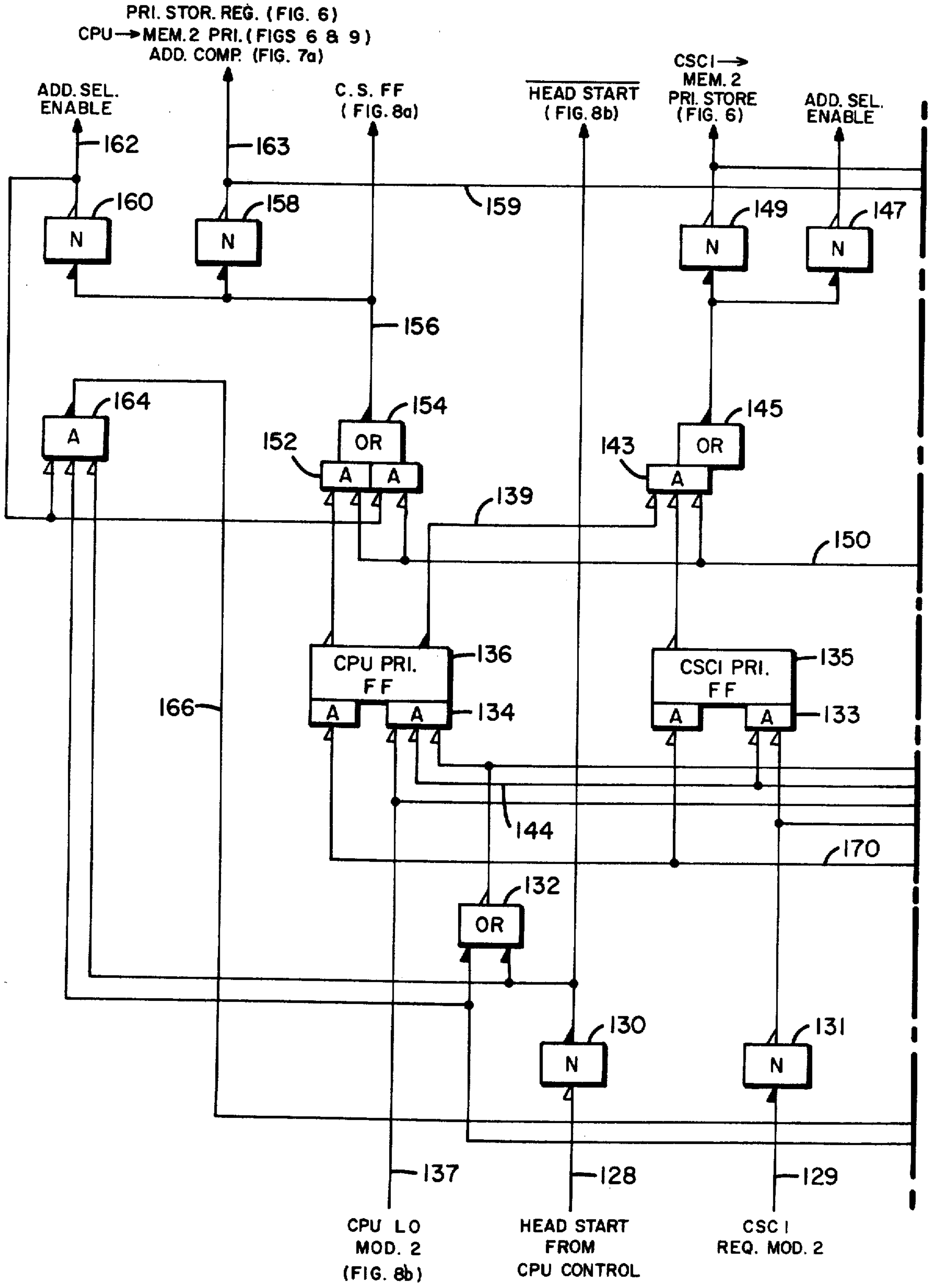
Figure 4B:
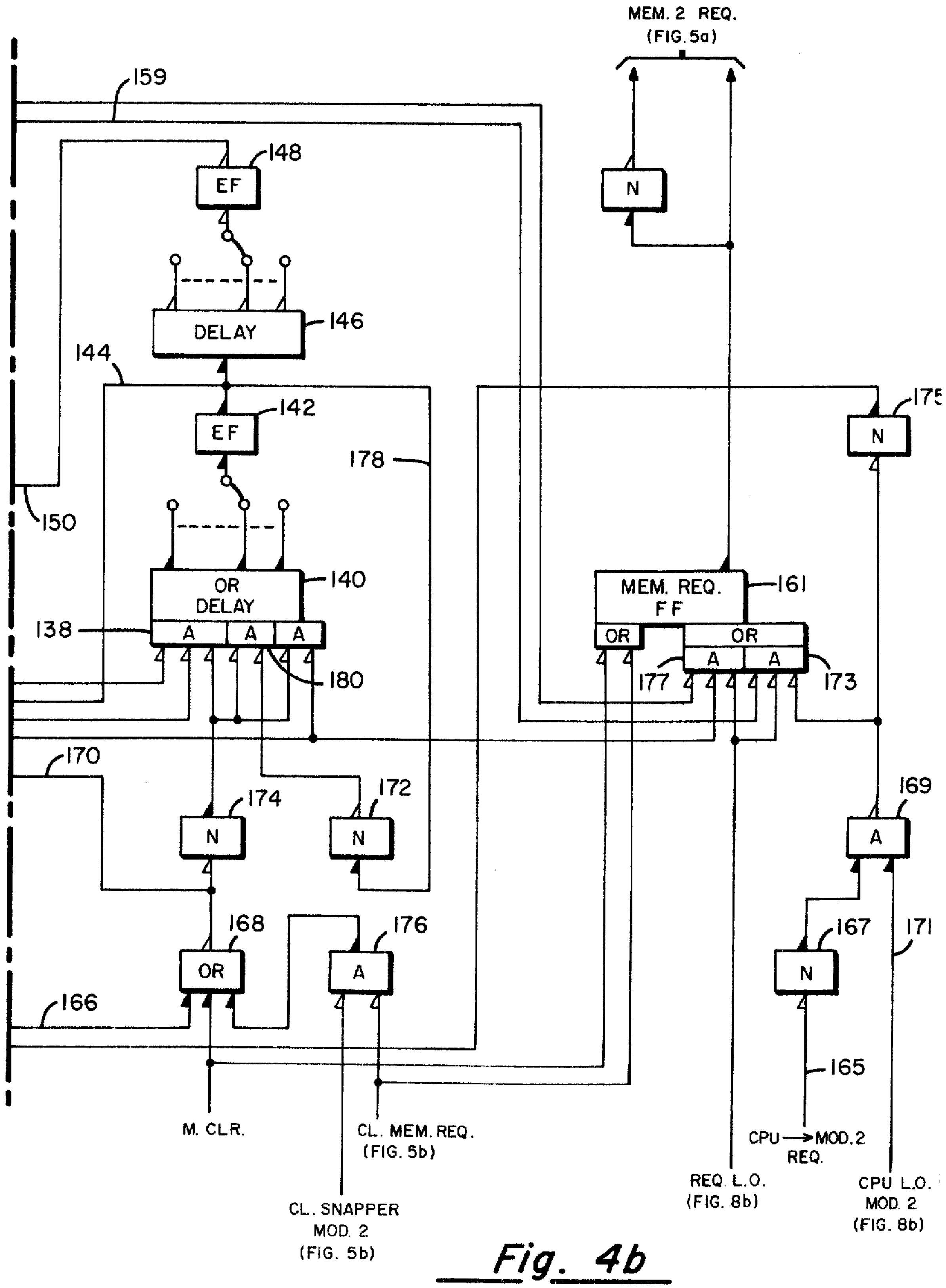

Still referring to the Priority network of FIGS. 4a and 4b, let it be assumed that CPU 0 is presenting a request to Memory Module 2 at the same time that the other CSC in the system (CSC 1) is also presenting a request to Memory Module 2 of memory bank 38 (FIG. 1). The request from CPU 0 to Memory Module 2 enters CSC 0 on conductor 165 as a binary low signal and is inverted by NOT circuit 167 such that a high will be applied as a first input to AND gate 169 when a CPU request is present. If the CPU is not locked out from presenting a request to memory 2, the input on conductor 171 will also be high, thereby satisfying AND gate 169. The low output therefrom partially enables the AND gate 173 and also is fed back via inverter 175 to OR circuit 132 as an incoming CPU request to the CPU Priority flip-flop 136.

The Memory Request flip-flop 161 will be set, provided no Request Lockout signal is present and either the CPU Priority flip-flop 136 or the CSC 1 Priority flip-flop 135 is set. Once set, flip-flop 161 provides the triggering input to the CSC timing and control circuits of FIGS. 5a through 5c and will remain set until either master cleared or until it receives the command enable "Clear Request Memory 2" from the Timing and Control network.

Figure 6:
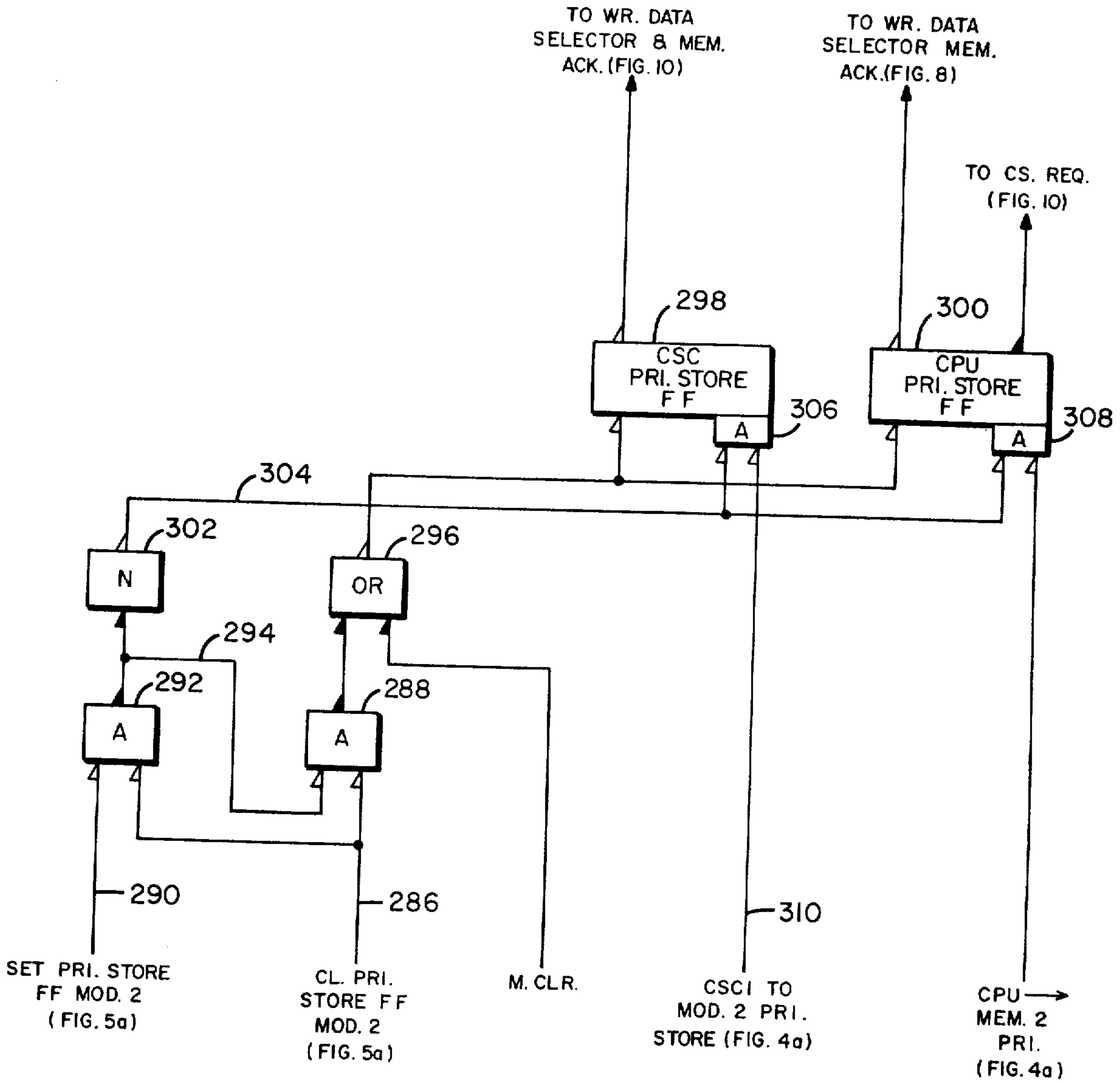
FIG. 6 illustrates the Priority Storage register of the Common Storage Controller.

As mentioned above, the request from CSC 1 enters the Priority network of CSC 0 on line 129 as a high signal. It is inverted by NOT circuit 131 and applied to AND gate 133 connected to the Set side of the CSC 1 Priority flip-flop 135. As was previously explained, the Head-Start signal had previously set the CPU Priority flip-flop 136 and initiated the Priority Snapper delay line 140 so that after a short period determined by the characteristics of the delay line 140, the emitter follower 142 produces a high signal to block any subsequent request from either CSC 1 or from CPU 0 from affecting the state of the Priority flip-flops 135 and 136. Because the Set output terminal of flip-flop 136 is connected by conductor 139 to one of the input terminals of AND gate 143, a high signal will be applied thereto whenever the CPU Priority flip-flop 136 is set. Accordingly, gate 143 is inhibited and the output from OR circuit 145 will remain low and will prevent CSC 1 from presenting address signals, via the Address Selectors of CSC 0, to Memory Module 2 of memory bank 38. Of course, if CPU 0 is not presenting a request to Memory Module 2 of bank 38, the CPU Priority flip-flop 136 would not be set and the gate 143 would be fully enabled when CSC 1 Priority flip-flop 135 is set, allowing NOT circuit 147 to produce the requisite low signal for use by the Address Selectors to enable them to transfer address representing signals from CSC 1 to Module 2 of memory bank 38. Similarly, NOT circuit 149 would be enabled to set the so-called CSC 1 to Memory 2 Priority Storage flip-flop (FIG. 6).

Next, let it be assumed that neither CPU 0 nor CSC 1 is presenting a request to Memory Module 2 of bank 38. Under these conditions, the Memory Request flip-flop 161 remains in its cleared state and the Head-Start signal on line 128 passing through NOT circuit 130 and OR circuit 132 will again cause the CPU Priority flip-flop 136 to be set so that the signal appearing on conductor 162 will be low at least for the period of time determined by the Priority Snapper network as previously described. The low signal on conductor 162 is applied as a first input to AND circuit 164 to partially enable it so that when the CPU control 22 drops the Head-Start signal from the line 128, the gate 164 will be fully enabled in the absence of a CPU request to Memory Module 2 from NOT circuit 175, and will output a high signal on conductor 166 which passes through OR circuit 168 causing a low signal to appear on conductor 170 and be applied to the Clear input terminal of the CPU Priority flip-flop 136. This resets the flip-flop and conditions it for the receipt of another Head-Start signal on a subsequent cycle or another CSC 1 request.

The combination of inverters 172 and 174, the AND circuit 176 and the OR circuit 168 function as a latch for the Priority Snapper delay line 140. Specifically, once the delay is initiated due to the enabling of its input gate 138 as previously described, the emitter follower 142 will produce a high output on conductor 178 which is connected to the input of inverter 172. The resulting output from this inverter will be low and is applied as a first input to the AND gate 180. So long as the Timing and Control circuits (FIGS. 5a through 5c) are not producing the command enables Clear Request Memory 2 and "Clear Snapper Memory 2" both inputs to AND gate 176 will be high so that OR circuit 168 will also produce a high output which, when inverted by NOT circuit 174, will cause the AND gate 180 to be fully enabled, irrespective to what happens to the inputs to the AND gate 138.

Figure 3:
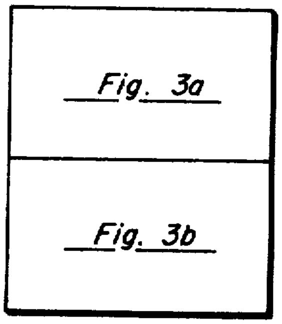
FIGS. 3*a* and 3*b* when arranged as shown in FIG. 3, illustrate a timing diagram showing the time and sequence in which the priority control and the timing and control circuits issue command enables to the rest of the Common Storage Controller and other units of the dual processor system.

Now that it has been shown how the Priority network of FIGS. 4a and 4b operates to produce waveforms B, C and E in FIG. 3a in response to the receipt of the Head-Start, a CPU request or CSC 1 request (waveform A), consideration will next be given to the Timing and Control circuits of FIGS. 5a through 5c to show the manner in which various other command enable signals shown on the timing diagram of FIG. 3 are produced.

TIMING AND CONTROL NETWORK — FIG. 5

The Timing and Control network for Memory Module 2 utilized in CSC 0 comprises a plurality of interconnected delay lines 182, 184 and 186. Substantially identical Timing and Control circuits are included in the CSC for use with Memory Module 3, but are not specifically shown in the drawings because to do so would unnecessarily complicate and obscure them.

As is well known in the art, when a signal is applied as an input to a delay line, it propagates down the line and energizes the various taps thereof in sequence and at intervals determined by the parameters of the electrical components comprising the line. In FIGS. 5a through 5c, the numerals associated with each tap are meant to indicate the order in which an output will appear at that tap. While in the case of delay line 182, the various taps will be energized in sequential order from left to right, it is to be noted that in delay lines 184 and 186, the delay line taps will be energized in other than straight sequential order, as indicated by the numerical designations appearing below the taps.

Figure 3A:
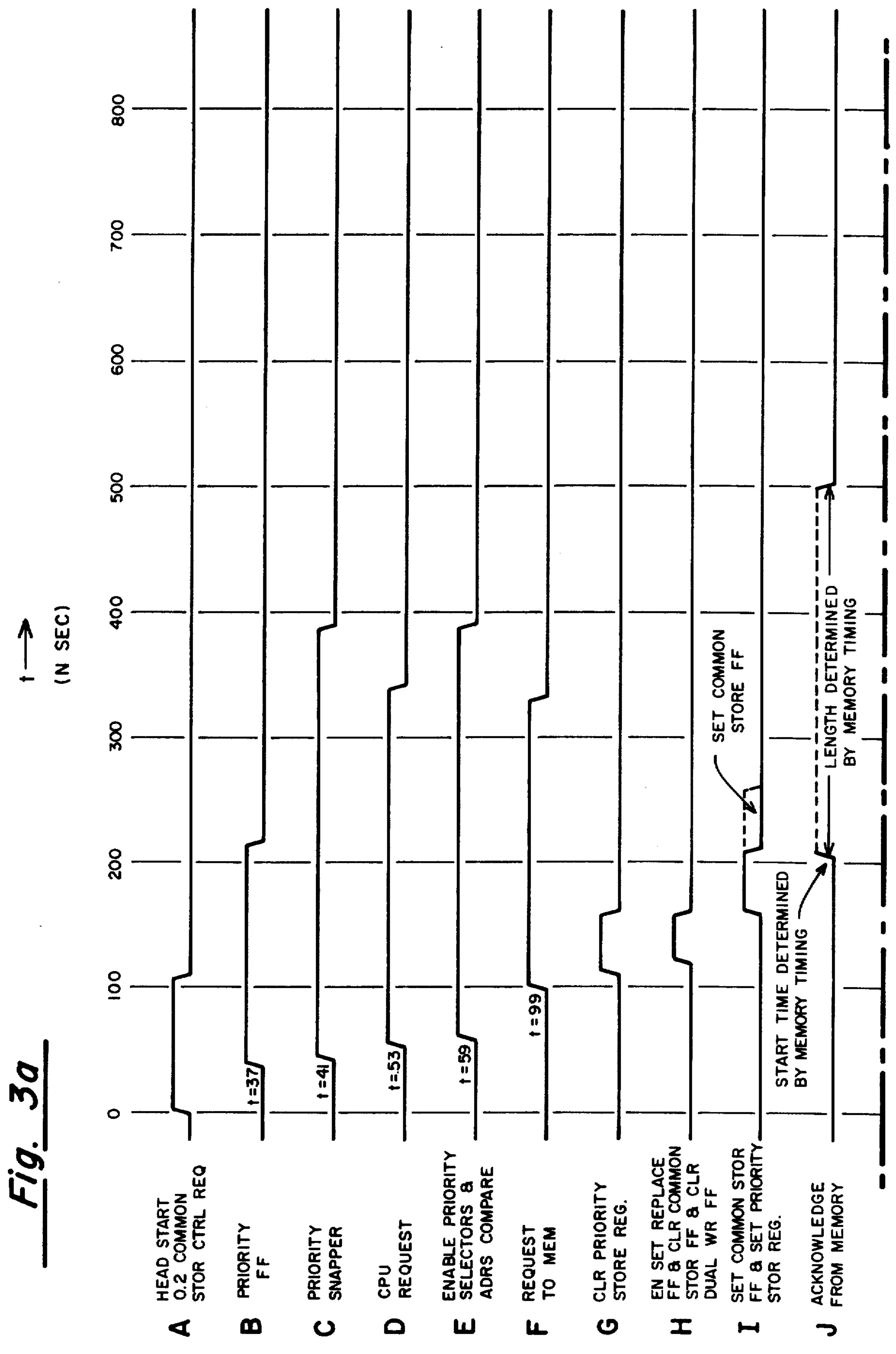

Referring to waveform F of the Timing diagram of FIG. 3a, the running of delay line 182 (FIG. 5a) is initiated when CPU 0 or CSC 1 presents a request to Memory Module 2, which causes a high signal to be applied by way of conductor 188 to a first input of AND gate 190. At the same time, CPU 0 presents a low input on conductor 192 connected as a first input to AND circuit 194. The output of AND circuit 194 is connected to a first input of AND circuit 195, and the output of AND gate 190 is cross-coupled to a first input of AND circuit 196. The outputs from AND gates 195 and 196 are OR'ed by circuit 197. It is also to be noted that the output of OR circuit 197 is cross-coupled to a second input terminal of both AND circuits 190 and 194. Prior to the receipt of the Memory Request control signals on lines 188 and 192, the output from OR circuit 197 is high. Then, assuming that no Master Clear pulse (M.CL.) is being applied to the network from the operator's control panel (not shown) by way of conductor 198, the incoming Memory Request will fully enable AND gate 190, causing its output to go low and to apply the initiating pulse to the delay line 182. The input to the delay line 182 will be held low until the flip-flop comprised of circuits 190 and 197 is cleared. This low input signal will appear at the outputs of the emitter follower amplifiers 198 through 208 in the sequence indicated by the numbers on the delay line, and will sequentially produce the command enables "Clear Priority Storage Register", "Enable Setting of Replace flip-flop", "Set Common Store flip-flop", "Set Priority Store flip-flop" and "Set Dual-Write flip-flop". Emitter follower 202 is coupled to a first input to AND circuit 210, associated with the Set input terminal of flip-flop 212, by means of a conductor 214. As will be explained more fully later on, when the output from emitter follower 202 goes low, it initiates the start of a pulse down delay line number 2. Following this, when the low pulse traveling down delay line number 1 reaches tap number 4, emitter follower 204 will produce a low output signal on line 216 which is coupled through OR circuit 218 to the second input terminal of AND gate 195. The presence of the low signal at OR circuit 218 will cause the gate 195 to be disabled and, in effect, clears the flip-flop, and terminates the low pulse inserted into the delay line. Thus, even though the Memory Request signal from the CPU may be somewhere around 280 nanoseconds long as shown in FIG. 3*a* waveform D, the low pulse applied to the delay line 1 will be cut-off or terminated in a lesser time, i.e., in the time that it takes for the input pulse to propagate down delay line 182 to tap 4.

At the time that a low output signal appears from emitter follower 202, AND gate 210 will be fully enabled, since at this time and the second input thereto from inverter 220 is also low. Flip-flop 212 is therefore set and a low signal from flip-flop 212 will be applied as a first input to AND gate 222. AND gate 222 will not be fully enabled, however, until the Memory Module 2 in bank 38 sends back a normal Acknowledge signal, indicating that it has received a request from CSC 0 and is in the process of honoring it. This Memory Acknowledge signal appears as a high binary input on line 224 and is inverted by NOT circuit 226, which, in turn, is connected to the second input of AND gate 222. With the Memory Acknowledge present, then, AND gate 222 will be fully enabled and flip-flop 228 will be set, causing a low signal to be applied to the input of delay line 184. Thus, it can be seen that the initiation of a pulse down the second delay line is dependent upon the timing chain (not shown but forming a part of each memory bank) and this is reflected in the waveform J in FIG. 3*a*.

As the low pulse propagates down delay line 184, it reaches tap 1 causing emitter follower 230 to produce a low output which constitutes the command enable "Enable CSC Acknowledge". A finite time later the pulse traveling down the line reaches tap 2, precipitating a series of events. First of all, the low output signal from emitter follower 232 is fed back by way of conductor 234 to one of the OR inputs associated with the Clear side of flip-flop 212. It is also brought back as the input to NOT circuit 220. Accordingly, the low signal on conductor 234 will disable AND gate 210 and will clear the flip-flop 212. The clearing of flip-flop 212 disables gate 222 associated with the Set terminal of flip-flop 228. It is to be noted further that emitter follower 236 is also connected to tap 2 of delay line 184, causing a low signal to appear on conductor 238 and be applied as a first input to the cross-coupled OR circuits 240 and 242 (FIG. 5*c*). The cross-coupled OR's also comprise a flip-flop network. When this flip-flop is set by application of a low input signal to OR circuit 240, the output from OR circuit 242 will go low and will stay that way until a low input signal is applied to one of the inputs to OR circuit 242, at which time the flip-flop will revert to its cleared state.

Referring again to the sequence numbers on delay line number 2, it can be seen that as the low pulse inserted in delay line number 2 propagates down the line, tap 3 will next be energized causing emitter follower 244 to output a low signal which is connected by conductor 246 to the OR circuit 248 associated with the Clear side of flip-flop 228. Clearing of the flip-flop causes the input to delay line 184 to again go high, thereby defining the width of the pulse traversing this line.

As the timing pulse travels down delay line 2, it will next cause emitter follower 250 (connected to tap 4) to produce the command enable "Clear Request Lockout" and "Clear Memory Request flip-flop". Next, emitter follower 252 outputs a low signal constituting the command enable "Set CSC 1 Request". This is followed by an output from emitter follower 254 which produces the command "Clear Priority Snapper". Tap 7 is the next to receive the low pulse propagating down delay line 2 and causes emitter follower 256 to output a low signal which is connected as a first input to AND gate 258. If the CPU is executing a Replace type instruction, the Replace Active flip-flop (FIG. 9) will be set and a low signal will be applied via conductor 260 to the second input of AND gate 258. Under the assumed conditions, then, AND gate 258 will output a high signal identified as "Enable Replace Acknowledge".

The timing pulse upon reaching tap 8 causes emitter follower 264 to output a low signal on conductor 266 which is connected as one input to the AND gate 268 associated with the Set side of flip-flop 270. Because at this time tap 2 of delay line 186 is high, the output from emitter follower 272 will also be high. This signal, when inverted by NOT circuit 274, fully enables AND gate 268 to set the flip-flop 270. Upon setting flip-flop 270, the output from its Clear side goes low and starts a timing pulse down the delay line 186.

Figure 3B:
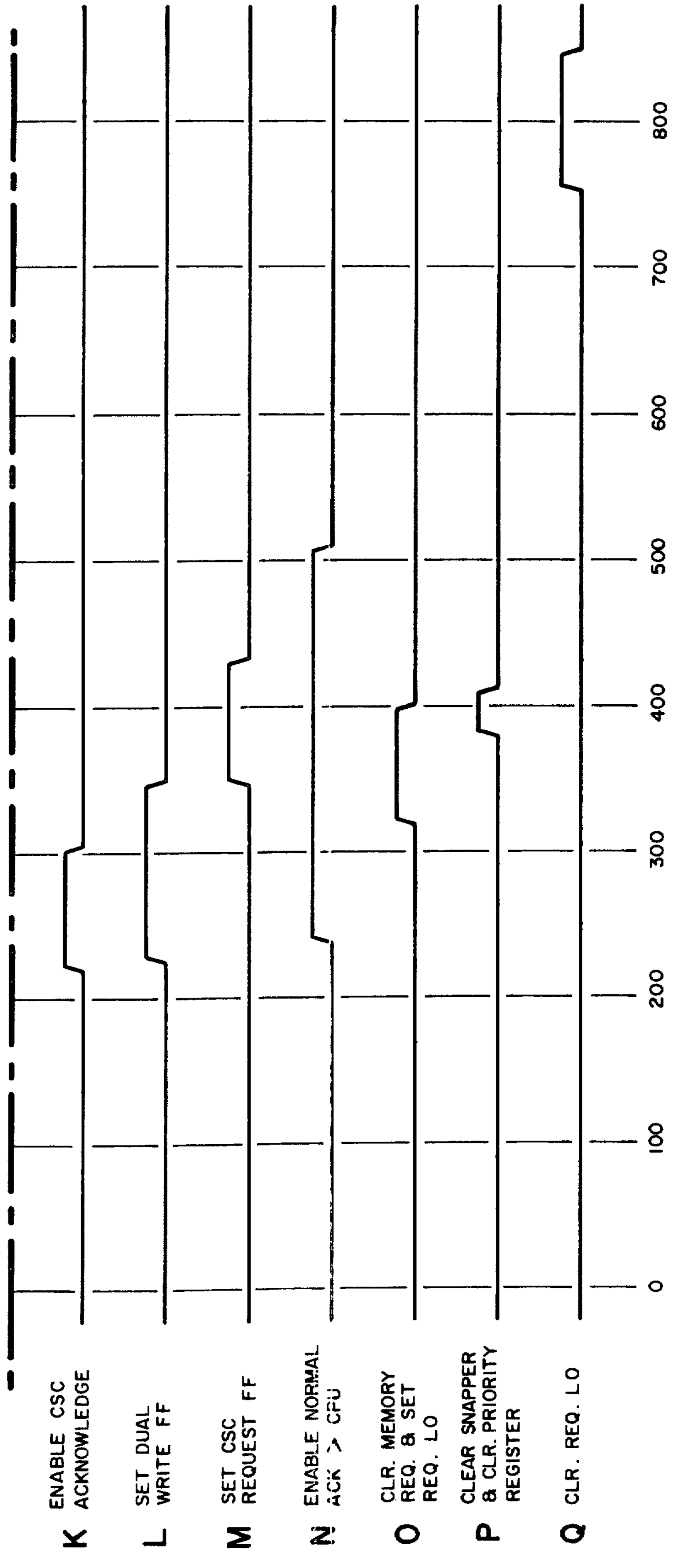

The pulse inserted into delay line number 3 first teaches tap number 1 causing emitter follower 278 to output a low signal which, when applied to the OR circuit 242 causes the cross-coupled pair to switch states so that the output from OR circuit 242 will again go high terminating the command enable "Enable Normal Acknowledge" (FIG. 3*b* — waveform N). Following this, the low signal traversing delay line 186 reaches tap 2 causing the output from emitter follower 272 to assume a binary low condition. Inverter 274 therefore outputs a high signal disabling gate 268. The low output from emitter follower 272 is also applied to OR circuit 280 to the Clear input terminal of flip-flop 270. The clearing of flip-flop 270 causes a high signal to be applied to the delay line, thus limiting the length of the pulse traversing the line.

The shortened pulse continues to travel down delay line 3 and when it reaches tap 3, emitter follower 282 emits the command enable Clear Request Lockout.

This completes a description of the construction and mode of operation of the Timing Control network used in the CSC. Consideration will now be given to the various logic circuits which utilize the command enable signals generated by the Priority network of FIGS. 4*a* and 4*b* and the Timing and Control network of FIGS. 5*a* through 5*c* to cause the CSC to operate in its intended manner.

PRIORITY STORAGE REGISTER — FIG. 6

Figure 2:
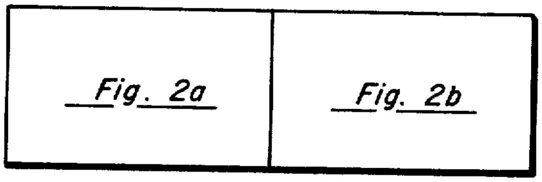
FIGS. 2*a* and 2*b* when arranged as shown in FIG. 2, show a logical block diagram of a Common Storage Controller used in the system of FIG. 1.
Figure 2A:
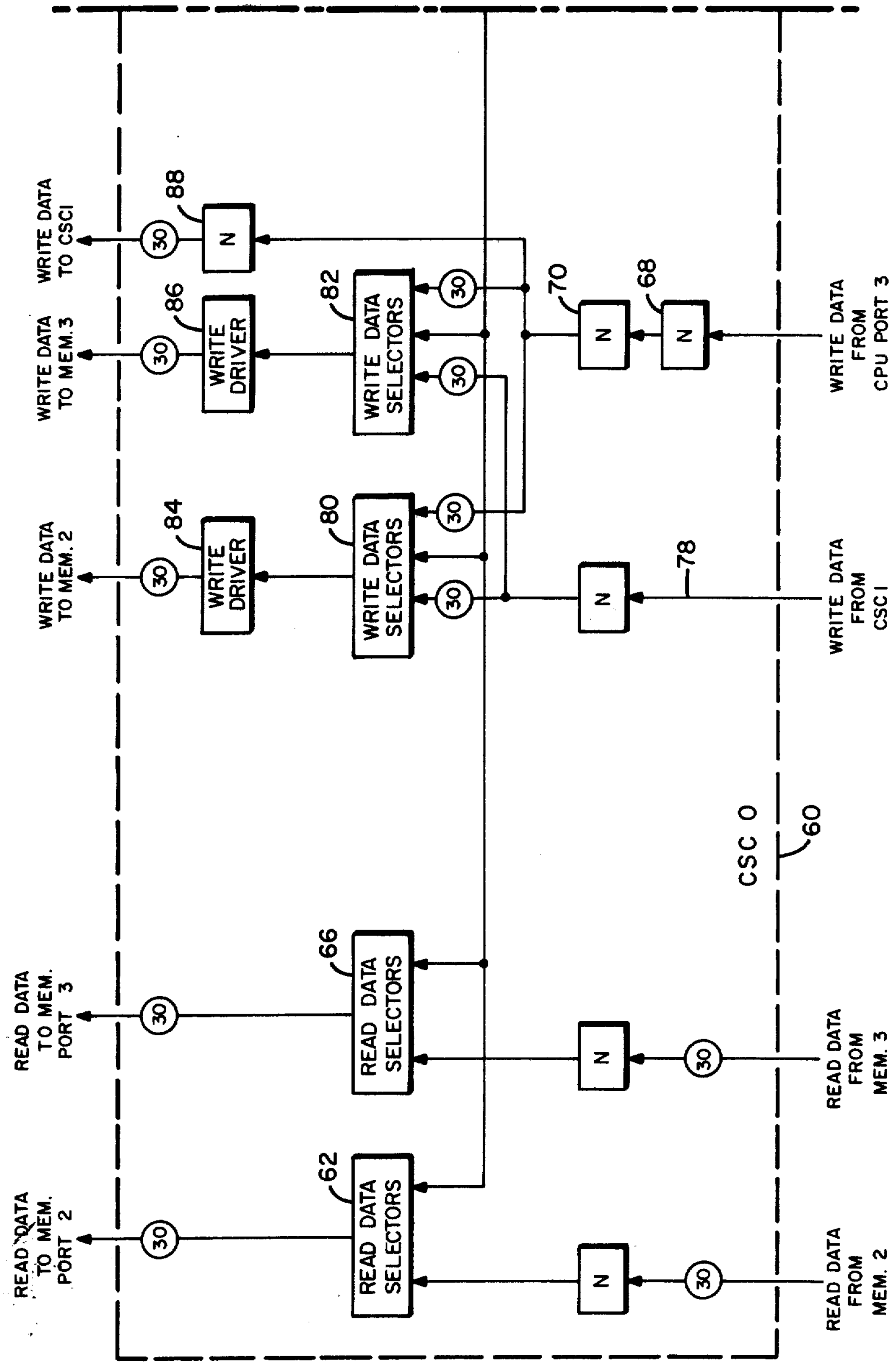
Figure 2B:
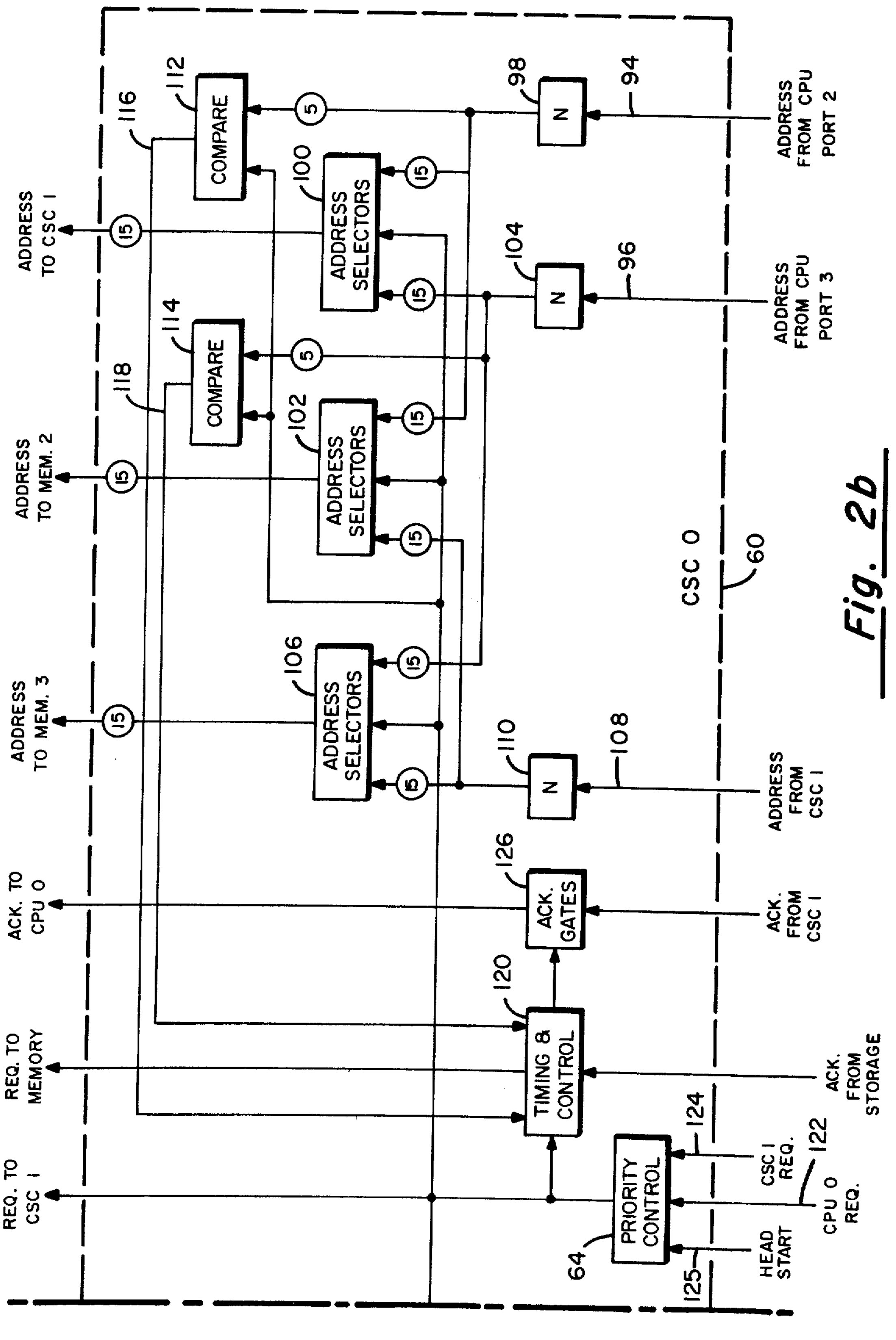

FIG. 6 illustrates the Priority Storage Register which forms part of the Priority Control network 64 in FIG. 2. Again, only the Priority Storage Register associated with Memory Module 2 is shown. Included in the Priority Control network 64 would be another substantially identical circuit which is associated with Memory Module 3.

By referring to the Timing diagram of FIG. 3*a*, it can be seen that the command Clear Priority Storage Register (waveform G) is produced approximately 110 nanoseconds after the HeadStart signal appears from the CPU. This signal is developed at the output of emitter follower 198 associated with delay line 182 in the Timing network of FIG. 5*a* and is applied to conductor 286 as a first input to AND gate 288. At this time, a high signal is present on conductor 290 because the command "Set Priority Storage flip-flop" is not yet being generated by the CSC Timing circuit of FIG. 5a. Hence, AND gate 292 will not be enabled and the second input to AND gate 288 appearing on the conductor 294 will be low. Gate 288 is therefore fully enabled, producing a high output to OR circuit 296 which inverts this signal, causing a binary low signal to be applied to the Clear terminals of the CSC Priority Storage flip-flop 298 and the CPU Priority Storage flip-flop 300. This signal resets these flip-flops, conditioning them for the receipt of a new Priority Request.

Figure 5A:
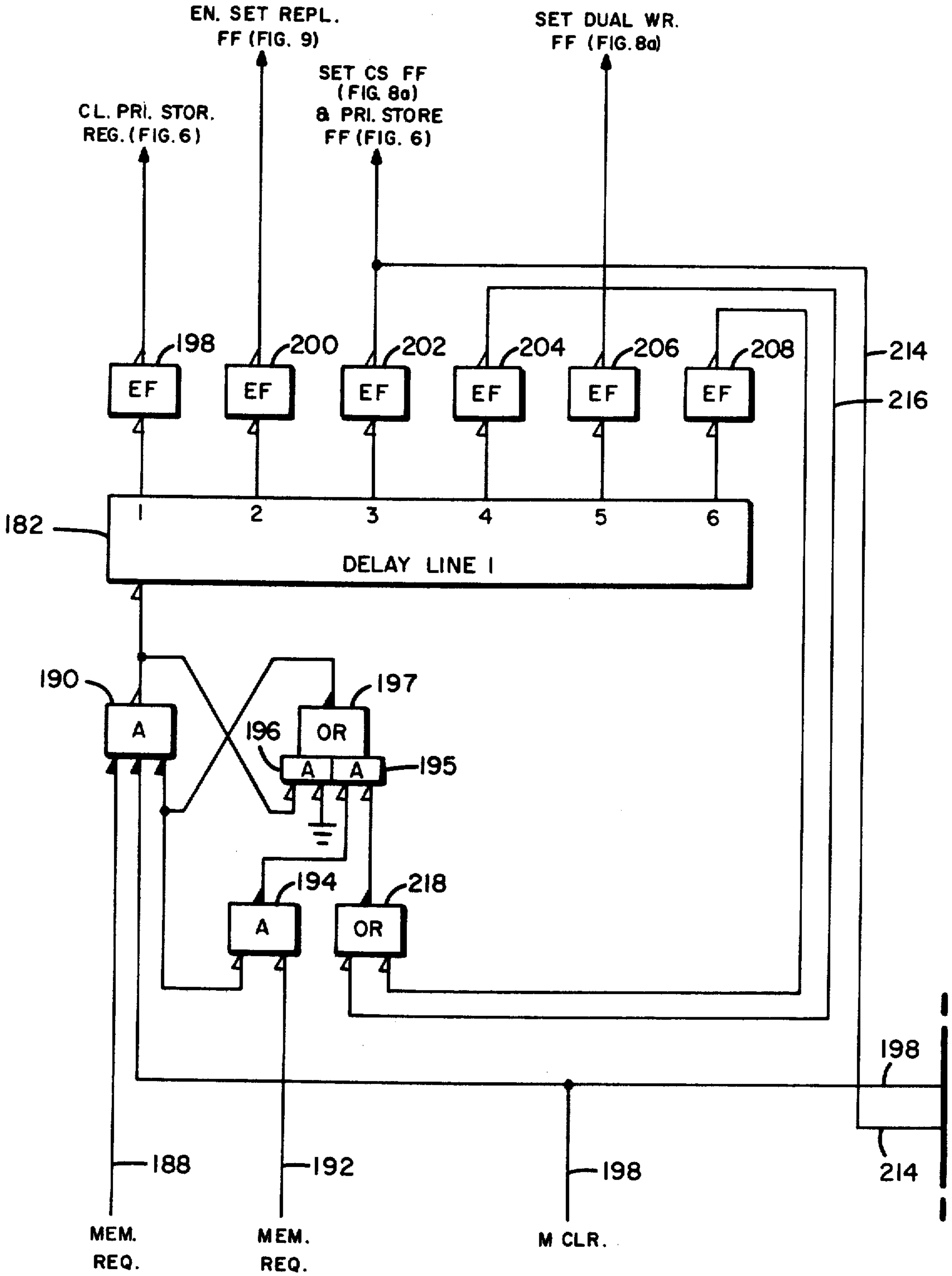
Figure 5B:
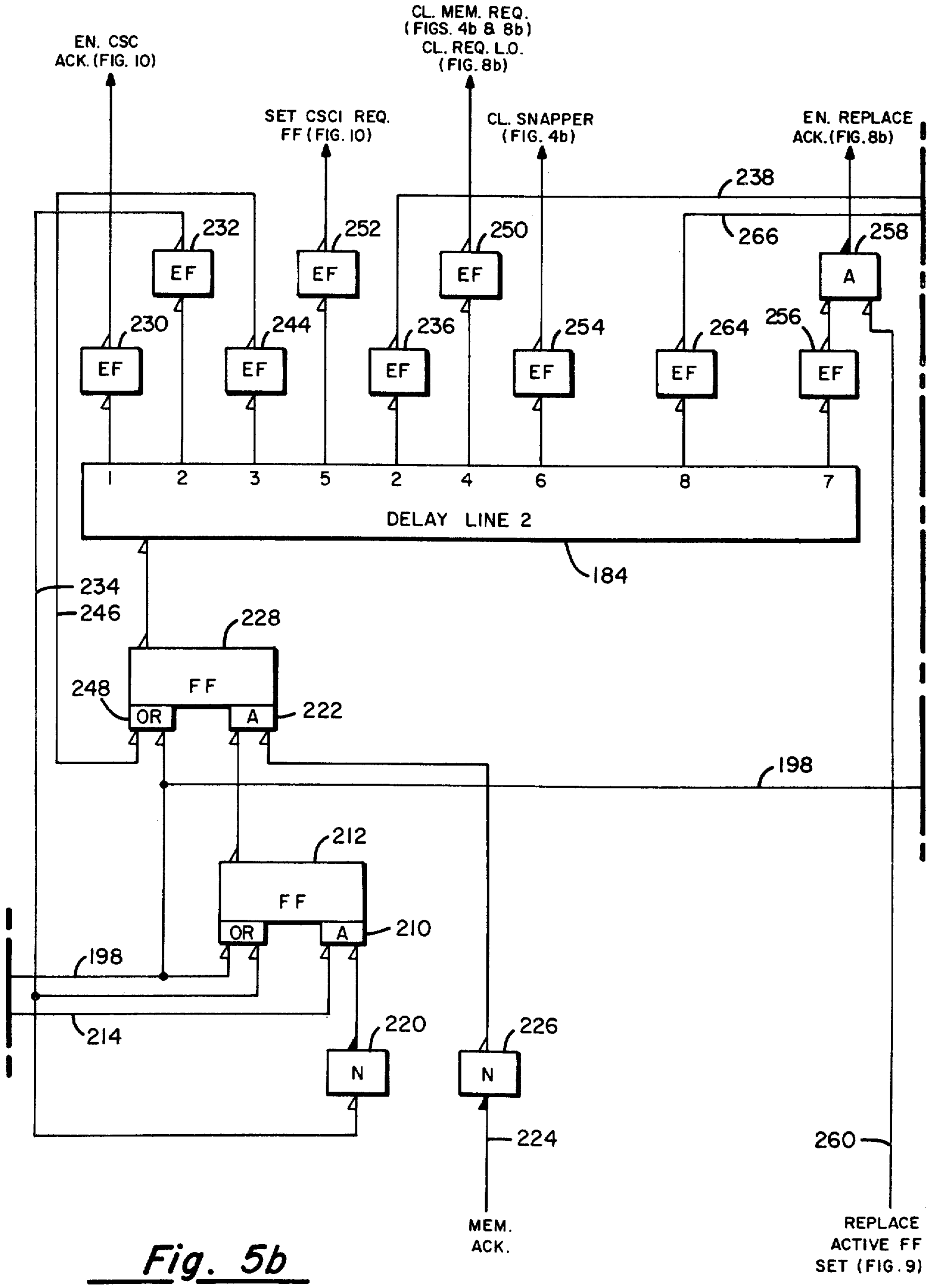
Figure 5C:
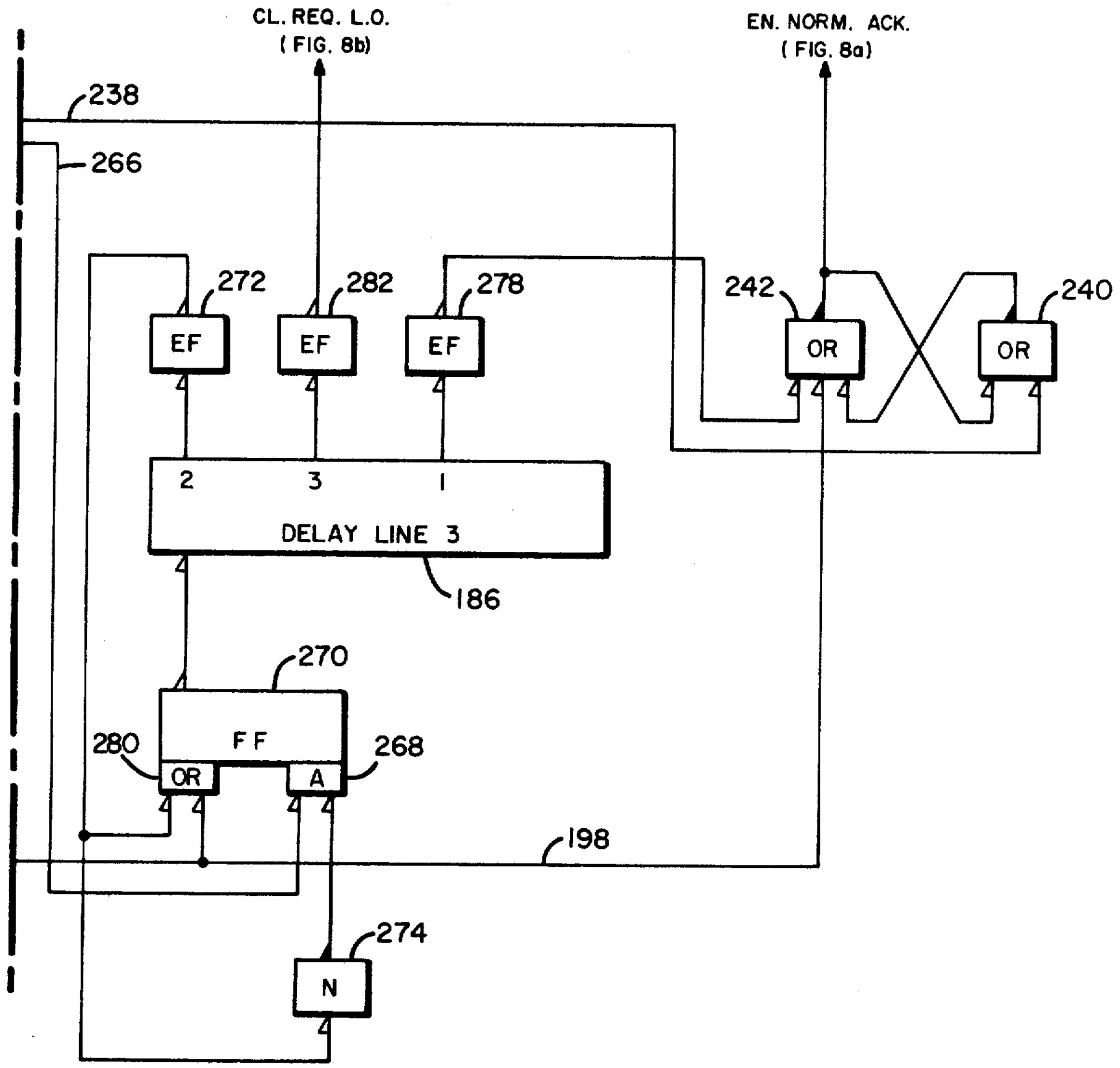

Prior to the time that the Clear signal is removed from line 286, the Timing circuit of FIG. 5*a* generates the command enable Set Priority Storage flip-flop, causing the signal on conductor 290 to go low. Gate 292 will now be fully enabled and will produce a high output signal on conductor 294 which disables gate 288 and removes the reset signal from the flip-flops 298 and 300. Inverter 302 outputs a low signal on conductor 304 which is connected as a first input to the AND gates 306 and 308 respectively associated with the Set side of the flip-flops 298 and 300. Assuming that the Priority circuit of FIG. 4*a* has its CPU Priority flip-flop 136 set by a CPU Request signal, it will be gate 308 which is fully enabled so that only flip-flop 300 will be set. On the other hand, if it is assumed that CSC 1 was presenting a Request on input line 129 (FIG. 4*a*) and CPU 0 was not simultaneously presenting a request to CSC 0, the flip-flop 135 in FIG. 4*a* would be enabled and would apply a binary low signal to input line 310 (FIG. 6) so that when the command from the Timing chain, Set Priority Storage flip-flop, is generated and applied to the input line 290, AND gate 306 would be satisfied, causing the CSC Priority Storage flip-flop 298 to be set. The outputs from the Clear side of the Priority Storage flip-flops 298 and 300 are connected as enable lines to the Write Data Selectors and to the Memory Acknowledge circuits yet to be described.

Summarizing momentarily, prior to initiating a Storage Request, the processor sends a Head-Start signal to its associated CSC in order to pre-condition the Priority logic in the CSC. When the CSC receives the Head-Start signal, it gates this signal into the Priority Register along with any request from CSC 1, the other CSC in the system. CSC 0 at this time initiates the Priority Snapper Delay for storage modules 2 and 3 and after a short delay period, prevents any further requests from being accepted by CSC 0. The Priority Snapper Delay also gates the highest Priority Request into the Memory Request Logic where it waits until a Memory Request, if any, is received from the CPU. When a request is received, the appropriate Priority Storage flip-flop (FIG. 6) is set. The request, along with the write data and the address where this data is to be written, is transferred to the selected storage module via the Address Selector and the Write Data Selectors which are enabled by the Priority Storage flip-flops. CSC 0 then waits for an Acknowledge signal to be returned from the storage module being addressed.

ADDRESS COMPARE LOGIC — FIG. 7

Figure 7A:
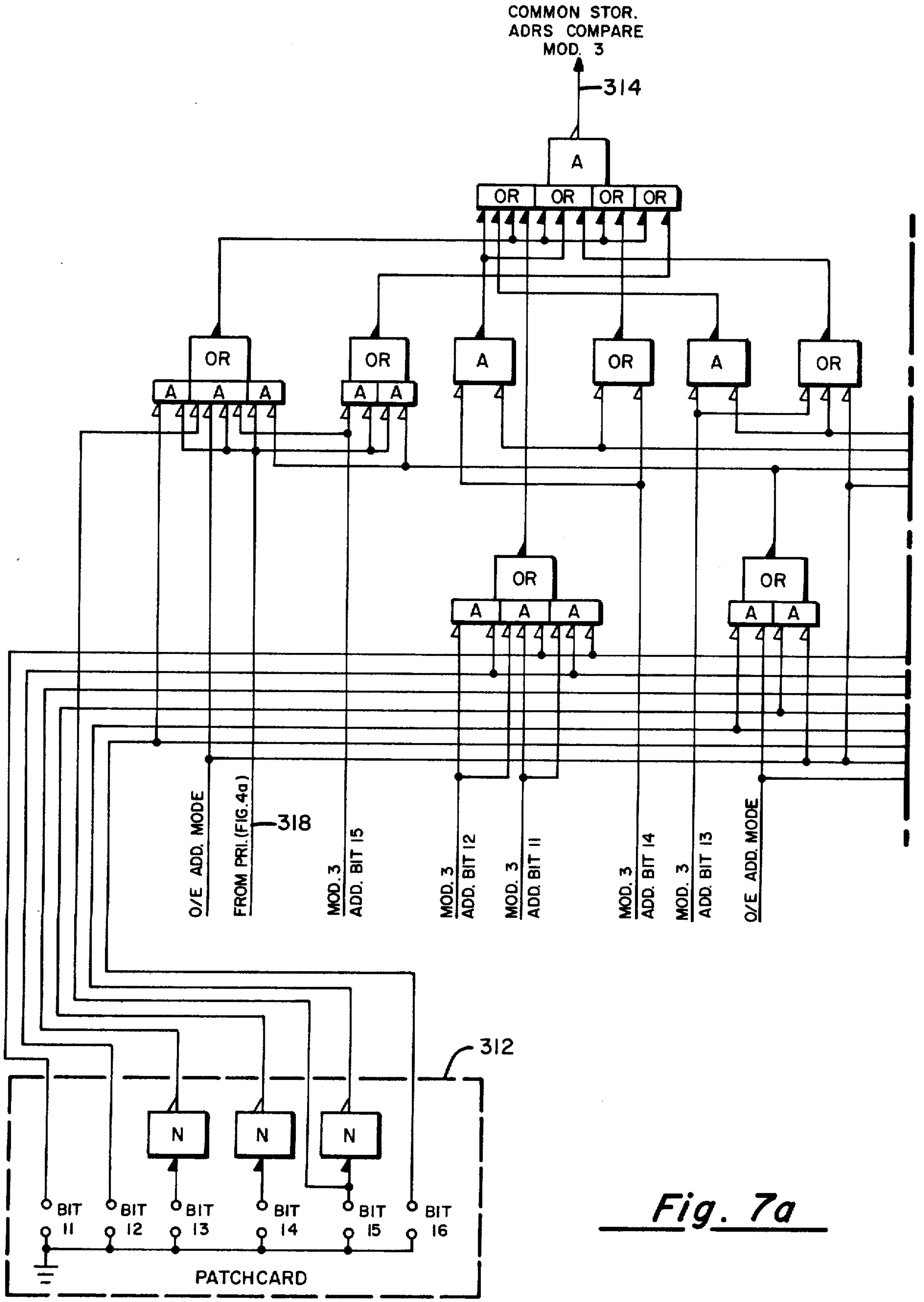
Figure 7B:
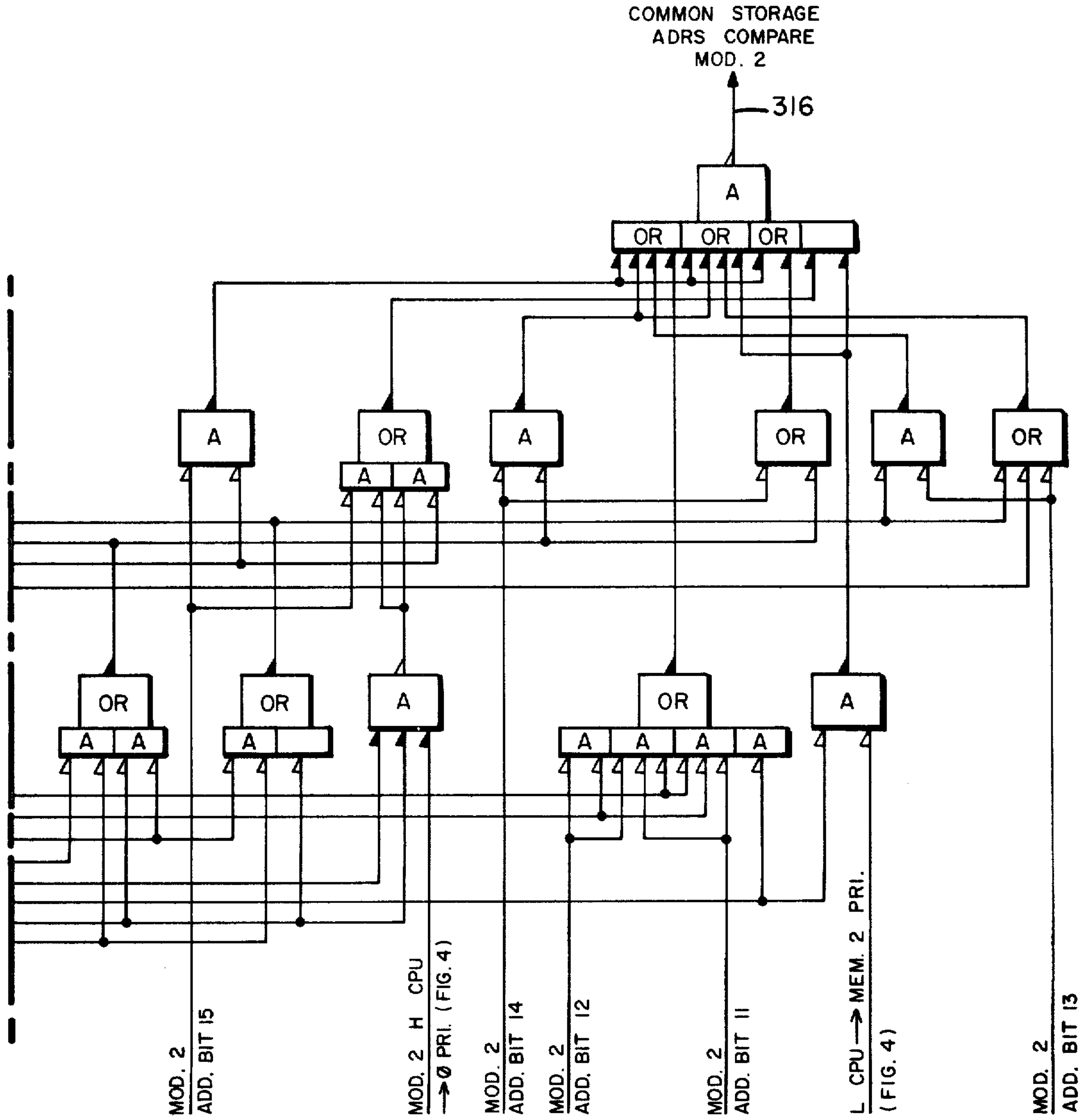

FIGS. 7*a* and 7*b* show the Address Compare logic used in the CSC(s). This logic determines whether the address, which the CPU presents along with its request signal, lies in the common storage area of the memory module being addressed.

There are three factors which determine whether a CPU reference is in the common storage area, namely:

1. the storage module requested;
2. the addressing mode being used in the CPU (e.g. straight, odd-even or sequential; and,
3. the address in the module being referenced.

The size of the common storage area in memory is variable and can be selected by the operator by means of a patchcard from a minimum of 2,048 words to a maximum of 65,536 words in 2,048 word increments. In the preferred embodiment of the invention, the common storage area is allocated to the highest storage addresses of the central processing unit and are identical in capacity in each memory bank.

The patchcard used for defining the size of the common storage area is shown enclosed by broken line box 312 in FIG. 7*a*. By selectively connecting the grounded (high) terminals to their associated contacts by means of a jumper, the highest address not in common storage can be defined. For example, assuming that Memory Modules 0 through 3 contain 131,072 words of storage, if jumpers are connected across the terminals for bits 12 through 16 and no jumper is connected across the terminals for bit 11, the size of the common storage area will be 2,048 words, whereas if jumpers are connected across the terminals for bits 11 through 15, a no jumper is provided across the terminals for bit 16, the common storage area will comprise 65,536 words. By selecting the remaining possible combinations of jumpers and no jumpers for bits 11 through 16, it is possible to uniquely define the common storage area in increments of 2,048 words in between the above two limits.

The remainder of the circuitry shown in FIGS. *7a* and *7b* is used to compare an incoming address from the CPU with the value determined by the patchcard 312 connections for determining whether the incoming address is greater-than the address value represented by the patchcard connections. If the value is greater, then it is known that the memory area involved is in that allocated to common storage. It may be recalled from the earlier discussion of the UNIVAC 494 memory addressing scheme (supra pages 4 and 5) that the CPU generates a 17 bit address for each storage location reference and that of these 17 bits, two are used for defining the memory module and the remaining 15 are used for addressing a particular word location within that module. Accordingly, the "greater-than" comparator of FIGS. *7a* and *7b* examines bits 11 through 15 of the incoming address from the CPU and compares them with the boundary address established by the patchcard connections for bits 11 through 15 and produces a low output signal on either line 314 or 316 if the incoming address from the CPU satisfies the greater-than condition. Bit 16 on the patchcard is a means for selecting whether Memory Module 2 or Memory Module 3 contains the boundary value address. Thus, when the operator's control panel (not shown) has a control switch thrown to a position specifying the odd/even addressing mode and when the Priority circuit of FIG. 4 produces its low output from NOT circuit 158, which is connected to conductor 318 in FIG. 7, one or the other of the output lines 314 or 316 will have a low signal developed thereon, provided the address comparison reveals that the incoming CPU address is greater-than the boundary value. Because the construction and mode of operation of greater-than comparators are well known in the art, it is not believed necessary to describe the operation of the comparator with specific examples.

FIGS. *8a* and *8b* together illustrate the control logic circuitry which stores the manifestation that the address representing signals presented to the CSC lie within the common storage area. Again, for simplification only, that circuitry associated with Memory Module 2 is shown and it is to be understood that substantially identical circuits are provided in the CSC for Memory Module 3. In operation, when the Compare circuitry of FIGS. *7a* and *7b* detects that the address presented by the CPU is greater than the boundary address established by the patchcard connections 312, the low output appearing on line 316 (FIG. *7b*) is applied to line 320 in FIG. *8a* as a first input to the AND gate 322 associated with the Set side of the Common Store flip-flop 324. A second input to AND gate 322 comes from AND gate 326 which is fully enabled when OR circuit 154 (FIG. *4a*) is outputting a high signal on conductor 156 indicating that the Priority network has awarded request priority to the CPU. This high signal is applied to AND gate 326 by way of line 328. The other input to AND gate 326 comes by way of inverter 330 from the timing circuits of FIG. *5a* when the command enable Set Common Store flip-flop is produced at the output of emitter follower 202.

The setting of the Common Store flip-flop 324 in the manner indicated results in a low signal being applied by way of conductor 332 to a first input of AND gate 334 associated with the Set side of the Dual Write flip-flop 336, thus partially enabling the gate. Then, when the command enable Set Dual Write flipflop is produced at the output of emitter follower 206 in the Timing and Control network of FIG. *5a*, AND gate 334 will be satisfied and the Dual Write flip-flop 336 will be set. The Dual Write flip-flop, when set, provides an indication that a request has been received to perform a write operation into the common storage area of the memory.

Also illustrated in FIG. *8a* are a pair of cross-coupled OR inverter circuits which comprise a flip-flop 338. Flip-flop 338 is normally in its cleared condition, i.e., OR circuit 340 is normally outputting a low signal on conductor 342. When the Dual Write flip-flop 336 is set as previously explained, the low signal appearing on conductor 344 partially enables AND gate 346. Then, when the Timing chain of FIG. *5c* produces the command enable Enable Normal Acknowledge, a low signal is applied to conductor 348 to fully enable AND gate 346 causing its output to go high, thereby setting the flip-flop 338. Flip-flop 338 will remain set until either master cleared or until the next Head-Start signal is produced at the beginning of a subsequent operation cycle. Thus, flip-flop 338 ensures that an Acknowledge signal from CSC 1 to CSC 0 cannot be returned to CPU 0 before a normal Acknowledge signal is transmitted from the memory bank 38 to CPU 0.

Before proceeding with a description of the construction and mode of operation of the various control circuits used in the CSC, it is deemed expedient at this point to present a functional description of the operation when the CPU in question is executing a so-called "Replace Class Instruction". A Replace class instruction replaces the data in the main memory with the result of an operation performed upon this data and, as a result, requires two successive memory cycles to complete the instruction. During the first memory cycle, the data is read out from a given memory address into the CPU where some arithmetic or logic operation is performed on it. The second memory cycle is needed to restore the data, as now modified, back into the address from which the original operand originated.

In order to prevent conflicts in accessing the common storage area during Replace class instructions, a Replace lockout is provided in the CSC to block all other Replace class instructions as well as all write storage references to the common storage area from the other processor. The purpose of this lockout is to prevent CPU 1, for example, from altering data which is in the process of being altered by CPU 0. If two CPU's attempt a Replace type instruction simultaneously, the conflict is resolved by giving priority to the particular CPU whose CSC is assigned the lowest priority number.

Thus, this Replace lockout allows two CPU's to reference the same address in common storage during a Replace type instruction and ensures that these instructions will be executed sequentially. The lockout does not affect read references to memory which are not part of a Replace type operand fetch or references to private storage addresses.

Figure 8B:
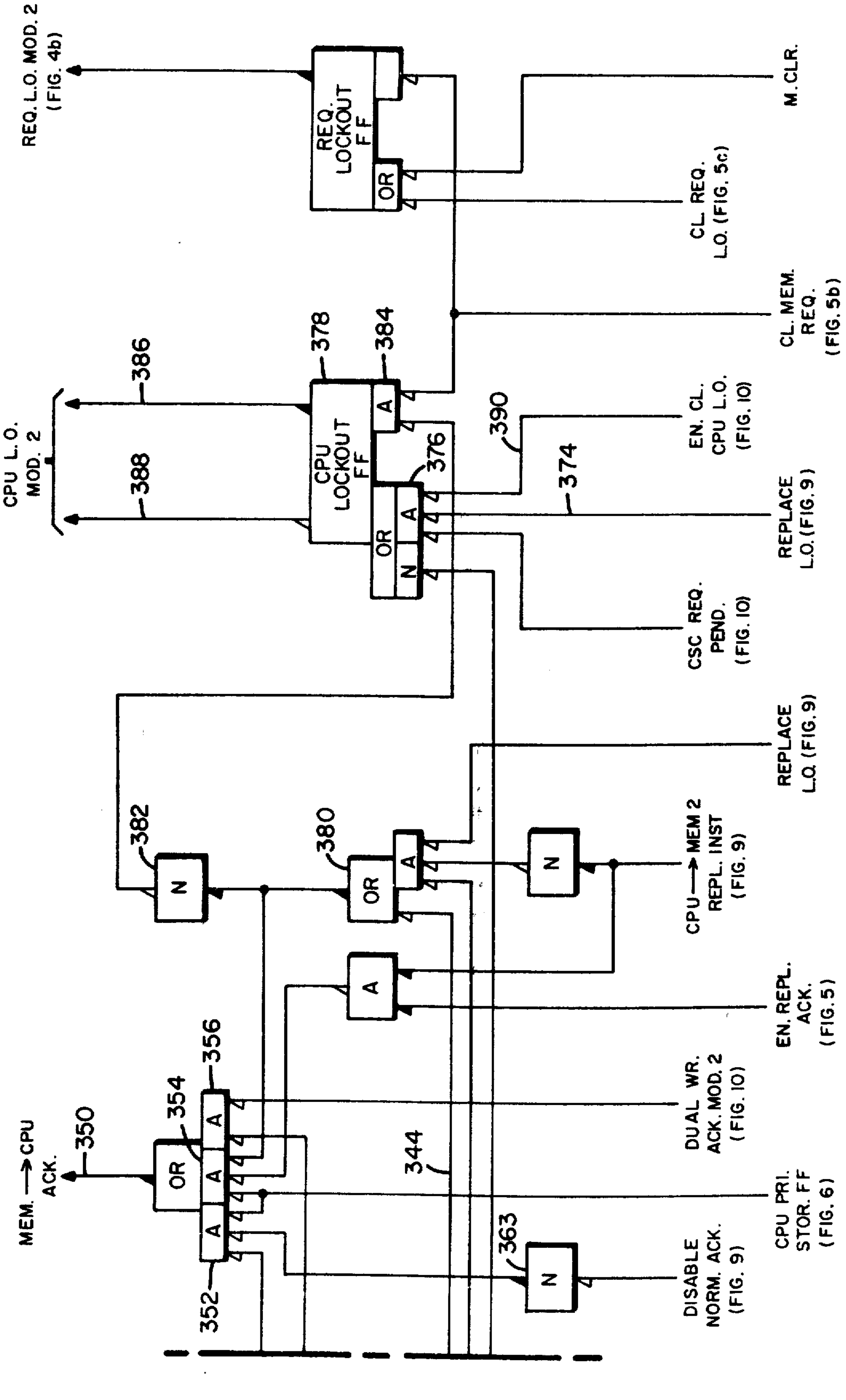

Referring still to FIG. 8*b*, the Acknowledge signal to the CPU will appear on line 350 when either of the following conditions are met:

1. CPU 0 has been awarded priority over CSC 1 and a normal reference to the private (non-common) storage has been made such that AND gate 352 will be fully enabled when the timing chain of FIG. 5*c* generates the command Enable Normal Acknowledge.
2. CPU 0 has been awarded priority and is executing a Replace instruction involving an address in the common storage area and the timing chain is producing the command Enable Replace Acknowledge, satisfying the AND condition imposed by gate 354. It is to be noted that the command Enable Replace Acknowledge occurs some 100 nanoseconds after the command Enable Normal Acknowledge, thus allowing time to abort the reference when a Replace instruction is involved.
3. A Dual-Write operation is involved and CSC 1 has responded by forwarding the Dual-Write Acknowledge back to CSC 0 to thereby satisfy AND gate 356.

REPLACE LOCKOUT LOGIC — FIG. 9

Leaving the discussion of the construction and mode of operation of the circuits of FIGS. 8 and 8b momentarily, reference will now be made to FIG. 9, which shows the logic for producing the desired lockout control signals when the CPU is executing a Replace class instruction. Again, the operation starts when the Head-Start signal is received from the processor. The Head-Start signal is gated into the Priority register (FIG. 4*a*) and initiates the Priority Snapper Delay, all as previously described. When the Storage Request signal is received by the CSC from the processor, the Memory Request flip-flop 161 sets and the Request is presented to the storage unit. The Address Compare logic (FIGS. 7*a* and 7*b* ) determine that the address is in the common storage area.

The setting of the Storage Request flip-flop 161 initiates the first Timing and Control delay line 182 which provides the command enables to do the following:

1. The Replace Active flip-flop 358 (FIG. 9) sets because the Replace instruction line 360 is active, thus fully enabling the AND gate 362. Let it be assumed that CSC 1 senses that CPU 1 is attempting to execute a Replace class instruction. If CPU 0 is already engaged in executing a Replace instruction, the Replace Active flip-flop 358 in CSC 0 will be set and will be presenting a Replace Lockout control signal (high) to CSC 1 on line 366. This signal disables AND gate 368 in CSC 1 and prevents the Replace Active flip-flop in CSC 1 from being set. Unless the Replace Active flip-flop in CSC 1 is set, CPU 1 cannot perform a Replace class instruction if the reference is to the common storage area of the main memory bank. However, the read reference of the Replace instruction which was begun in CSC 1 is completed, but the data word so obtained is not used. (In a similar fashion CPU 0 cannot carry out a Replace class instruction involving the common storage area if CPU 1 is already engaged in executing one, since the setting of the Replace Active flip-flop in CSC 1 serves to disable the corresponding flip-flop in CSC 0. This prevents any new requests to CSC 1 to be honored at the time that it is performing the consecutive read and write operations called for by the Replace instruction.)
2. The contents of the Priority register (135 and 136 in FIG. 4*a*) is gated into the Priority Store register (FIG. 6).
3. If a write reference is involved, the Dual-Write flip-flop 336 is set.

When the Memory Acknowledge signal is received from storage on line 224 (FIG. 5*b*) in response to the first Storage Request (the read request), the second delay line 184 is initiated. This delay line gates the Acknowledge to CPU 0 via line 350 (FIG. 8*b*) and prepares CSC 0 for receipt of the next Head-Start signal which will come from CPU 0. This completes the read portion of the Replace instruction.

The second Head-Start signal is received from the processor and priority is again established in the manner already described. A Write Request control signal, a storage address, and the date to be written are received from the processor and passed through the associated selector networks in the CSC to the storage unit. The same write data and address representing signals are then presented to CSC 1 in the normal dual-write manner. When the Dual-Write flip-flop 336 has been set, indicating that one of the CPU's is in the process of writing new information into the common storage area of its associated memory bank, it is necessary to delay the transmission of a normal Acknowledge signal from that memory bank back to the processor originating the Dual-Write request until such time as the same data has been entered into the common storage area of the other processor, via the CSC of that other processor and a Dual-Write Acknowledge has been returned from the CSC of that other processor to the CSC of the originating processor. The signal used to disable the transmission of the normal Acknowledge control signal from Module 2 of memory bank 38 to CPU 0 appears on line 359 in FIG. 9 when the AND gate 361 is fully enabled. The AND condition will be satisfied if the Common Store flip-flop 324 and the Dual-Write flip-flop 336 are set, indicating that a Write request to the common storage area has been awarded priority by CSC 0, or if CPU 0 is executing a Replace class instruction and the Common Store flip-flop 324 is set. The resulting output on line 359 connects to an input of AND gate 352 (FIG. 8b) by way of inverter 363 and when it is low, it precludes gate 352 from producing the "Memory to CPU Acknowledge" signal on line 350. Thus, this last mentioned control signal will not occur until the conditions imposed by either gate 354 or 356 are met, as already described.

It can happen that one of the CPU's (say CPU 1) is executing a Replace class instruction and is between the read reference and the associated write reference when CPU 0 presents a Dual-Write request or a Replace instruction request to CSC 0. Under this assumption, CPU 0 will have been locked out by CPU 1, since the Replace Active flip-flop in CSC 1 had been set, thereby preventing the Replace Active flip-flop in CPU 0 from setting, as already described. With the Replace Active flip-flop of CSC 0 cleared, output line 364 (FIG. 9) will be high and with CSC 1 currently doing a Replace class instruction, AND gate 370 will be fully enabled resulting in a high signal on line 372 which connects to line 374 (FIG. 8*b*) and blocks the AND gate 376 from outputting a signal which would clear the CPU Lockout flip-flop 378, previously set when the Dual-Write flip-flop 336 was set. (The setting of flip-flop 336 causes a low on conductor 344 which passes through OR circuit 380 and NOT circuit 382, partially enabling AND input gate 384 of the CPU Lockout flip-flop 378.)

The setting of flip-flop 378 produces a high signal on conductor 386 which, in turn, is connected to conductor 137 (FIG. 4*a*). The low signal on conductor 388 connected to the clear side of the CPU Lockout flip-flop 378 is applied via line 171 in FIG. 4*b* to disable gate 169. Thus, it can be seen that when the CPU Lockout flip-flop is set, the priority logic is precluded from honoring a request from CPU 0 until such time as CPU 1 completes the write cycle portion of its Replace class instruction.

Upon completion of the write reference to the memory of CPU 1, the Replace Active flip-flop in CSC 1 is cleared in a manner yet to be described, so that CSC 0 is no longer locked out. Thus, AND gate 376 will no longer be blocked and when the Acknowledge control signal from CSC 1 is returned to CSC 0 so as to produce a low signal on conductor 390, gate 376 will be fully enabled and the CPU Lockout flip-flop 378 will be cleared. Now, the original request from CPU 0 which was previously aborted due to the fact that CPU 1 was engaged in a Replace class instruction execution can be received by the CSC 0 priority logic and processed in the usual fashion already described.

ACKNOWLEDGE CONTROL LOGIC — FIG. 10

Figure 10:
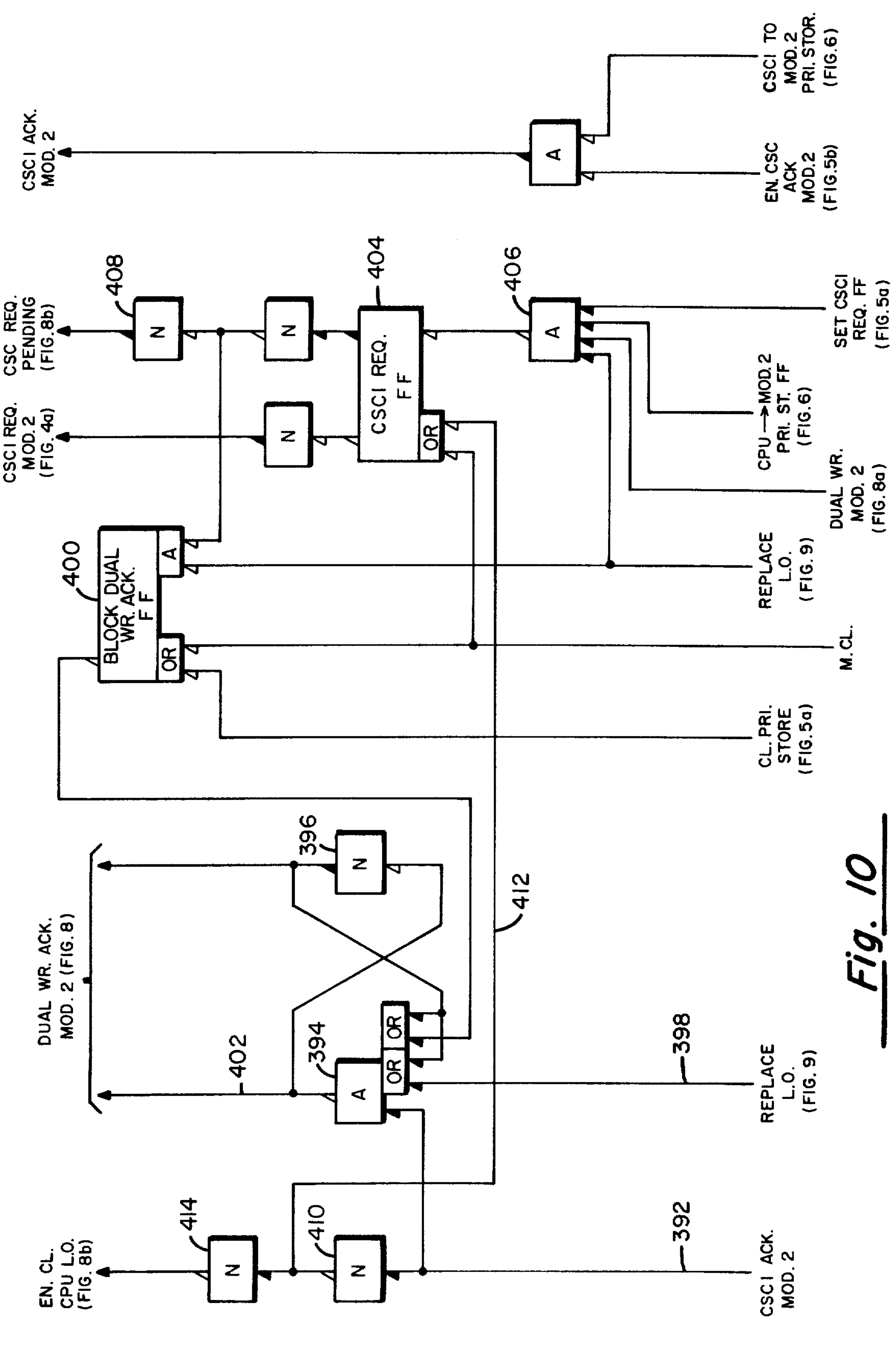
FIG. 10 illustrates the control circuitry for generating the Acknowledge control signals utilized by the CPU's in the system.

FIG. 10 illustrates the logic for controlling the generation of the Acknowledge control signal in CSC 0 in response to the Acknowledge generated in CSC 1 upon the completion of a Dual-Write into the common storage area of memory bank 48. The Acknowledge signal from CSC 1 enters CSC 0 via line 392 as a high signal and is applied as a first input to a cross-coupled latch circuit including AND gate 394 and NOT circuit 396. If no Replace Lockout signal is received on line 398 prior to the receipt of the CSC 1 Acknowledge signal on line 392 or the Dual-Write Acknowledge flip-flop 400 is not cleared prior to the receipt of the CSC 1 Acknowledge signal, the output from NOT 396 will be high and will hold the output from AND 394 low, irrespective of what may subsequently happen on the line 398 or the flip-flop 400. The output from AND circuit 394 on line 402 connects to the input of AND gate 356 (FIG. 8b) and when the flip-flop 338 is set, as already explained, an Acknowledge signal will be delivered to CPU 0 via line 350 in FIG. 8b.

If a Replace Lockout had preceded the receipt of the Acknowledge from CSC 1, the latch comprised of circuits 394 and 396 could not have been set by the subsequent Acknowledge signal on line 392 and no Acknowledge signal would have been returned to the CPU until the lockout condition had been eliminated.

The Block Dual-Write Acknowledge flip-flop 400 is set by the simultaneous occurrence of a Replace Lockout control signal and the setting of the CSC 1 Request flip-flop 404. Flip-flop 404, in turn, is set when the inputs to AND circuit 406 are simultaneously high. Thus, when the Timing and Control network of FIG. 5*b* generates the command "Set CSC 1 Request FF", flip-flop 404 will be set, provided the Priority Storage networks of FIGS. 4 and 6 have awarded priority to CPU 0 over CSC 1 and the Dual-Write flip-flop 336 (FIG. 8*a*) is also set. As long as flip-flop 404 is set, a high signal is outputted from NOT circuit 408 indicating that there is a request to CSC 1 still pending, which prevents the CPU Lockout flip-flop 378 from being cleared. As mentioned above, as long as the flip-flop 378 is set, the priority network cannot honor a CPU request, but instead will process the request from the other CSC in the system.

Once set, the CSC 1 Request flip-flop 404 remains so until the CSC 1 Acknowledge is received by CSC 0 on line 392. The signal is inverted by NOT circuit 410 and applied via line 412 to the Clear side of flip-flop 404. The receipt of the Acknowledge signal from CSC 1 also causes the output from NOT circuit 414 to go high which blocks AND gate 376 (FIG. 8*b*) for the duration of the Acknowledge signal and prevents the CPU Lockout flip-flop 378 from being cleared during this time interval.

This completes a description of the details of the control logic and non-conventional components of the Common Storage Controller depicted generally in the block diagram of FIG. 2. It is believed unnecessary to specifically show and describe the details of the remaining components, namely, the Read Data Selectors, the Write Data Selectors and the Address Selectors since, as mentioned, these are merely gating arrays of conventional design, well known in the computing arts, for controlling the transfer of signals from one unit to another in a parallel manner when enabled by the requisite commands from the control, priority or timing networks which have been described.

While there have been shown and described the fundamental novel features of the invention as applied to a preferred embodiment, it will be understood that various omissions, substitutions and changes in the form and details of the illustrated embodiment may be made by those skilled in the art without departing from the spirit of the invention. It is the intention therefore, to be limited only as indicated by the scope of the following claims.

What is claimed is:

1. A digital data processing system comprising in combination:

a. first and second central processor units;

b. first and second memory banks coupled to said first and second central processor units respectively, for storing information at addressable locations therein, 1. said first and second memory banks each having substantially identical cycle times and a predetermined range of addresses therein set aside for storing identical information;

c. first and second controller means connected intermediate said first central processor unit and said first memory bank and said second central processor unit and said second memory bank, respectively, said first controller means including, 1. means for detecting when said first central processor unit is writing new information into said first memory bank at an address within said predetermined range of addresses, and
2. means responsive to said detecting means for transferring said new information and said address to said second controller means for causing the same new information to be stored at said address in said range of addresses in said second memory bank.

2. A dual processor computing system comprising in combination:

a. first and second central processor units;

b. peripheral storage devices for storing a data base connected to said first and second central processors for supplying information thereto and receiving information therefrom;

c. a first memory bank coupled to said first central processor unit by a first common storage controller and a second memory bank coupled to said second central processor unit by a second common storage controller, 1. said first and second memory banks each having substantially identical cycle times and a predetermined range of addresses assigned to the storage of control information for locating data contained in said peripheral storage device;

d. control means in said first and second common storage controllers, responsive to a write request control signal and a memory address from one of said processor units for determining whether write data originated at said one processor unit is to be stored within said predetermined range of addresses in the memory bank coupled to said one processor unit;

e. gating means in said first and second common storage controllers responsive to said control means for transmitting said write request, said memory address and said write data to the common storage controller coupling the other of said processor units to its associated memory bank when said memory address is within said predetermined range of addresses; and f. means in said other common storage controller responsive to said transmitted request control signal for causing said write data to be stored at said memory address in the memory bank coupled to the other of said processor units.

3. The system as in claim 2 wherein said first and second common storage controllers further include acknowledge control means for returning an acknowledge control signal to the processor unit originating said write request control signal upon the completion of the storage of said write data within said predetermined range of addresses in both of said first and second memory banks.

4. The system as in claim 2 wherein each of said common storage controllers further include priority means for determining the order in which write requests originating at one of said processor units or received from the other of said common storage controllers will be honored.

5. The system as in claim 4 wherein said priority means in said common storage controllers is preconditioned to receive a request control signal from its associated central processor unit during each memory cycle.

6. Digital controller means for interconnecting at least two central processor units, each with its own associated memory bank for ensuring that information stored in a predetermined range of addresses in the memory bank associated with a first central processor unit will also be stored in the same predetermined range of addresses in the memory bank associated with the second central processor unit, comprising in combination:

a. address selector means adapted to receive address representing signals originating at one or the other of said two central processor units for selectively routing said address representing signals to each of said memory banks;

b. write data selector means adapted to receive write data representing signals originating at one or the other of said two central processor units and to selectively transfer said write data to a memory bank location determined by said address representing signals;

c. comparing means connected to receive said address representing signals for comparing said address representing signals with a predetermined boundary address and for producing a control signal when said address representing signals define an address within said predetermined range of addresses; and d. control means responsive to said control signal for enabling said write data selector means and said address selector means to transfer the address representing signals and data representing signals to the memory bank associated with the central processor unit other than the one originating said address representing signals and data representing signals.

7. The digital controller as in claim 6 and further including acknowledge control means for signaling the central processor means originating said address representing signals that said write data has been stored in said predetermined range of addresses in both of said memory banks.

8. In a dual processor data processing system wherein first and second processors, each with its own associated memory bank, are capable of sharing a common data base stored in a shared peripheral mass storage unit the combination comprising:

a. a first central processor unit coupled to a first memory bank by a first controller device;

b. a second central processor unit coupled to a second memory bank by a second controller device, 1. said first and second memory banks each having an identical predetermined range of addresses reserved for storing data relative to the accessing of information from said shared peripheral mass storage unit and substantially identical cycle times, 2. said first and second memory storing operands and instructions, including replace class instructions, at addressable locations therein including said predetermined range of addresses, and 3. said first and second controller devices being bidirectionally coupled together by address lines, data lines and control lines.

9. The system as in claim 8 wherein said first and second controller devices each include:

a. first gating means connected intermediate said address lines and said first and second memory banks and connected to receive address representing signals from its associated central processor unit and, when enabled, will convey said address representing signals to each of said memory banks;

b. second gating means connected intermediate said data lines and said first and second memory banks and connected to receive write data signals from its associated central processor unit and, when enabled, will convey said write data signals to each of said memory banks at locations established by said address representing signals; and c. control means including timing means responsive to write request control signals originated at said first or second central processor unit for enabling said first and second gating means in sequence.

10. The system as in claim 9 and further including:

a. third gating means connected intermediate said control lines and said first and second memory banks and said first and second central processor units and, when enabled, will convey acknowledge control signals from said memory banks to the central processor unit originating said address representing signals following the entry of said write data signals into each of said storage banks.

11. The system as in claim 9 wherein each of said first and second controller devices further include:

a. priority control means connected to receive request control signals from its associated central processor unit and from the other of said controller devices for establishing the order in which said request control signals are to be honored by said memory banks.

12. The system as in claim 11 and further including:

a. comparator means connected to receive said address representing signals from its associated central processor unit for generating a control signal when the received address lies within said predetermined range of addresses;

b. lockout control means responsive to said control signal generated by said comparator means and to a signal from said associated central processor unit produced when said associated central processor unit is executing a replace class instruction for generating a replace lockout control signal;

c. means for applying said replace lockout control signal to said third gating means for inhibiting said third gating means until both cycles of said replace class instruction have been completed; and d. means for applying said replace lockout control signal to said priority control means to inhibit said priority control means from honoring further requests from said other controller device until said third gating means is enabled.

* * * * *

UNITED STATES PATENT OFFICE
CERTIFICATE OF CORRECTION

PATENT NO. : 3,889,237

DATED : June 10, 1975

INVENTOR(S) : Merwin H. Alferness & John A. Miller

It is certified that error appears in the above-identified patent and that said Letters Patent are hereby corrected as shown below:

IN THE PRINTED PATENT:

COLUMN 22, CLAIM 8, LINE 48

After "memory" insert -- banks -- .

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*